US009064363B2

(12) United States Patent
Yuasa

(10) Patent No.: US 9,064,363 B2
(45) Date of Patent: Jun. 23, 2015

(54) AUTOMATED TRANSACTION APPARATUS, AUTOMATED TRANSACTION METHOD, AND PROGRAM STORAGE MEDIUM

(75) Inventor: Shuichi Yuasa, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 13/452,809

(22) Filed: Apr. 20, 2012

(65) Prior Publication Data

US 2012/0296811 A1 Nov. 22, 2012

(30) Foreign Application Priority Data

May 11, 2011 (JP) ................................ 2011-105923

(51) Int. Cl.
*G06Q 40/00* (2012.01)
*G07D 11/00* (2006.01)

(52) U.S. Cl.
CPC ................................ *G07D 11/0051* (2013.01)

(58) Field of Classification Search
CPC ....... G06Q 10/00; G06Q 20/00; G06Q 30/00; G06Q 40/00; G07D 11/051
USPC ........................................................ 705/3–44
See application file for complete search history.

(56) References Cited

U.S. PATENT DOCUMENTS

| | | | | |
|---|---|---|---|---|
| 6,247,573 | B1 * | 6/2001 | Itako et al. | 194/202 |
| 2010/0025911 | A1 * | 2/2010 | Sakamoto | 271/3.01 |
| 2011/0036682 | A1 * | 2/2011 | Koyano | 194/206 |

FOREIGN PATENT DOCUMENTS

| | | | | |
|---|---|---|---|---|
| CN | 102007518 A | | 4/2011 | |
| JP | 2001-053802 A | | 3/2001 | |
| JP | 2002-502531 A | | 1/2002 | |
| JP | 2006-343914 A | | 12/2006 | |
| JP | 2011-003051 A | | 1/2011 | |
| JP | 2011-059835 A | | 3/2011 | |
| WO | WO96/08795 | * | 3/1996 | G07F 5/24 |

* cited by examiner

*Primary Examiner* — Frantzy Poinvil
(74) *Attorney, Agent, or Firm* — Rabin & Berdo, P.C.

(57) ABSTRACT

An automated transaction apparatus is disclosed, which includes an identification section that, when a plurality of types of currency having mutually different currency units have been inserted, identifies the inserted currency; and a controller that effects control of a transaction with a user based on identification results determined by the identification section.

16 Claims, 14 Drawing Sheets

AUTOMATED TRANSACTION APPARATUS, AUTOMATED TRANSACTION METHOD, AND PROGRAM STORAGE MEDIUM

CROSS-REFERENCE TO RELATED APPLICATION

This application is based on and claims priority under 35 USC 119 from Japanese Patent Application No. 2011-105923 filed on May 11, 2011, the disclosure of which is incorporated by reference herein.

BACKGROUND

1. Technical Field

The present invention relates to an automated transaction apparatus, an automated transaction process, and a program stored medium storing automated transaction program.

2. Description of the Related Art

As described in, for example, Japanese Patent Laid-Open (JP-A) No. 2011-053802, automated transaction apparatuses capable of transactions using currency, for example cash, have become commonplace. Such automated transaction apparatuses identify currency inserted by a user, and perform transactions with the user based on the identification results.

However, conventionally such automated transaction apparatuses have been unable to identify more than a single currency unit. For example, automated transaction apparatuses installed in Japan are unable to identify currencies other than the Japanese yen. Consequently, there is a limitation to the types of currency with which previous automated transaction apparatuses are able to perform transactions.

SUMMARY

In consideration of the above circumstances, the present invention provides an automated transaction apparatus, automated transaction method, and program stored medium storing automated transaction program enabling transactions to be performed in more currencies than conventionally.

A first aspect of the present invention provides an automated transaction apparatus including: an identification section that, after a plurality of types of currency having mutually different currency units have been inserted, identifies the inserted currency; and a controller that effects control of a transaction with a user based on identification results determined by the identification section.

The first aspect may be configured such that the identification section ascertains whether or not the inserted currency is counterfeit currency; and the controller determines a type of processing for the counterfeit currency based on the currency unit of the counterfeit currency if the inserted currency has been ascertained to be counterfeit currency.

Configuration may also be made such that based on the currency unit, the controller effects control to determine the type of processing for the counterfeit currency as either: returning the counterfeit currency to the user; or retaining the counterfeit currency in a counterfeit currency storage section for storing counterfeit currency.

Configuration may also be made such that if the currency unit of the counterfeit currency is the euro, the controller determines the type of processing for the counterfeit currency as retaining the counterfeit currency in the counterfeit currency storage section.

Configuration may also be made to further include a storage unit that stores a counterfeit currency processing table in which currency units of counterfeit currencies are stored in association with types of processing for each of the currency units of counterfeit currencies.

Configuration may also be made such that the controller determines the type of processing for the counterfeit currency based on the counterfeit currency processing table stored by the storage unit.

Configuration may also be made here such that the identification section ascertains whether or not the inserted currency is counterfeit currency, and if the inserted currency has been ascertained to be counterfeit currency, the controller effects control of allowing the user to select whether the counterfeit currency is returned to the user, or the counterfeit currency is retained in the counterfeit currency storage section.

Configuration may also be made such that the controller effects control to exchange the inserted currency for a target exchange currency that is currency of a different currency unit to the currency unit of the inserted currency; and, if the user is to be paid coins for at least a portion of the target exchange currency, effects control to provide the user with a recording medium on which data relating to the monetary amount to be paid in coins is recorded.

Configuration may also be made such that the controller computes an input upper limit of the inserted currency based on a payout upper limit that is an upper limit for possible payouts of the target exchange currency and is based on a rate of the target exchange currency against the inserted currency; and, if a monetary amount of the inserted currency exceeds the input upper limit, effects control to cancel exchange of at least a portion of the inserted currency that exceeds the input upper limit.

Configuration may also be made such that the controller effects control to present the input upper limit to the user.

A second aspect of the present invention provides an automated transaction method including: after a plurality of types of currency with mutually different currency units for different usable regions have been inserted, identifying the inserted currency; and controlling a transaction with a user based on a result of the identification.

A third aspect of the present invention is a non-transitory storage medium that stores a program causing a computer to execute automated transaction processing, the automated transaction processing including: after a plurality of types of currency with mutually different currency units for different usable regions have been inserted, identifying the inserted currency; and controlling a transaction with a user based on a result of the identification.

According to the present aspects described above, transactions can be performed in more currencies than previously.

BRIEF DESCRIPTION OF THE DRAWINGS

Exemplary embodiments of the present invention will be described in detail based on the following figures, wherein.

DETAILED DESCRIPTION

Figure 1:
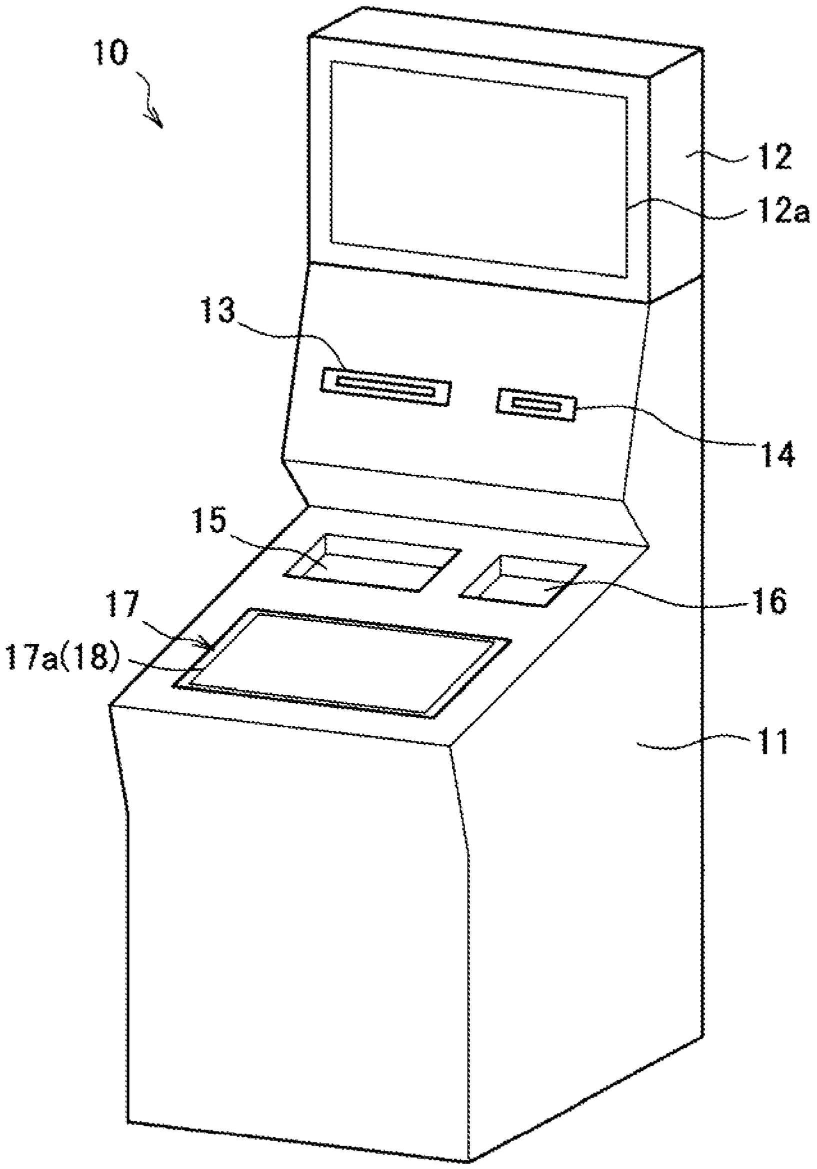
FIG. 1 is a perspective view illustrating an automated transaction apparatus according to an exemplary embodiment.

Detailed explanation follows regarding exemplary embodiments, with reference to the attached drawings. Elements in the present specification and the drawings that have substantially the same functional configuration are appended with the same reference numerals and further explanation thereof is omitted.

1. Automated Transaction Apparatus Configuration

External Configuration of Automatic Transaction Apparatus

Explanation will be first given regarding the external configuration of an automated transaction apparatus 10, with reference to FIG. 1. As shown in FIG. 1, the external configuration of the automated transaction apparatus 10 includes a casing 11, a rate providing section 12, a document input-output port 13, a card input-output port 14, a banknote input-output port 15, a coin input-output port 16, a transaction information providing section 17, and an input section 18.

Figure 2:
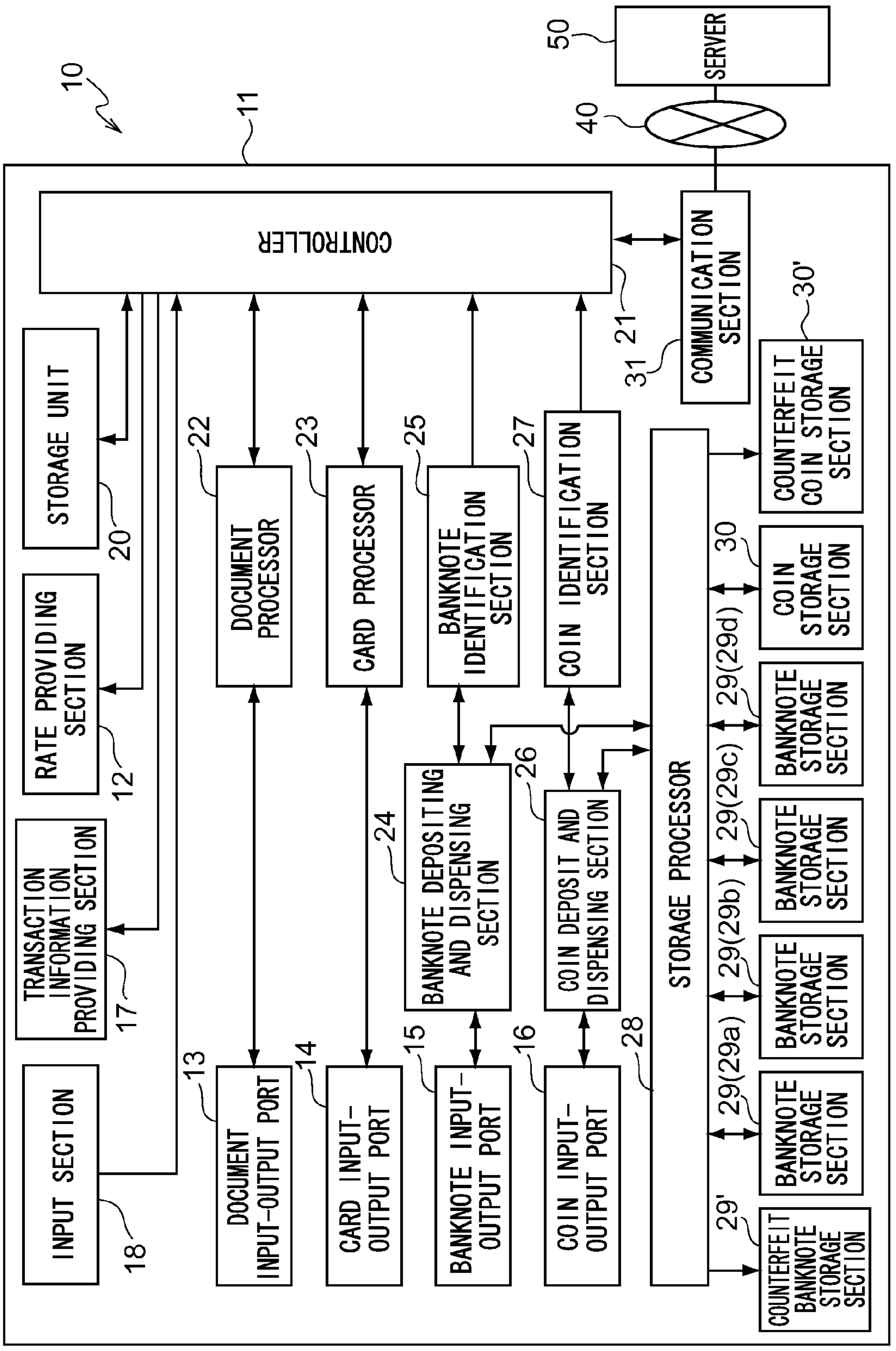
FIG. 2 is a block chart illustrating an internal configuration of the automated transaction apparatus according to the exemplary embodiment.

The casing 11 internally houses various configuration elements, such as a controller 21, as illustrated in FIG. 2. The rate providing section 12 includes a display 12*a* and a speaker, not shown in the drawings, and provides rates for each currency, by using for example US dollars (USD) as a reference currency. Namely, the rate providing section 12 displays a rate for each currency unit on the display 12*a* and employs the speaker, which is not shown in the drawings, to output speech with the rate for each currency unit. The rate for each currency unit is given as a rate against US dollars, for example, i.e., a monetary amount in the each currency unit against a unit amount of US dollars (=1 US dollar). For example a rate for Japanese yen is given as "1 US dollar=xx yen". Consequently, the rate providing section 12 provides the Japanese yen (JPY) rate by displaying "1 US dollar=xx yen" as text information on a screen and by speech output. Note that the rate may be provided by just one of screen display or speech output. The "rate of currency unit B against currency unit A" means the "monetary amount of currency unit B for a unit amount of currency unit A".

The rate providing section 12 provides historical rates for each currency (for example over the preceding week). The rate providing section 12 provides different rates according to the installation location (for example, airport or town) of the automated transaction apparatus 10. Namely, the rate providing section 12 provides different rates according to the installation location of the respective automated transaction apparatuses 10 even when installations are within a region (for example a country or community region) in which there is a common currency unit in circulation. Note that configuration may be made such that the rates are provided on the transaction information providing section 17. In such cases, the transaction information providing section 17 may be configured to provide the rates during idling (during a standby state prior to starting a transaction).

The document input-output port 13 is an input-output port for documents. A user may insert a document through the document input-output port 13. The document is also ejected from the document input-output port 13. Examples of documents include a passbook, a passport, a receipt and the like. Such a receipt may be issued according to the result of a transaction with the automated transaction apparatus 10.

The card input-output port 14 is an inlet and outlet for cards. The user may insert a card through the card input-output port 14. The card is also ejected from the card input-output port 14. Such cards are cards that function as storage media that are storable with various types of data. Examples of such cards include cash cards, prepaid cards and the like.

The banknote input-output port 15 is an inlet and outlet for banknotes, and the coin input-output port 16 is an inlet and outlet for coins. The user can insert plural types of currency having mutually different currency units (for example, Japanese yen and US dollars) in the banknote input-output port 15 and the coin input-output port 16.

The transaction information providing section 17 includes a display 17*a* and a speaker, which is not shown in the drawings, and provides information according to the progress of a transaction. That is, the transaction information providing section 17 displays information according to transaction progress on the display 17*a*, and outputs information according to the transaction progress as speech using the not-shown speaker. Note that configuration may be made such that information is provided by only one of screen display and speech output. The input section 18 is a touch panel provided on the surface of the display 17*a*. The input section 18 generates operation data according to input operation by the user (for example, a particular position touched) and outputs the operation data to a controller 21, which will be described later.

Internal Configuration of Automated Transaction Apparatus

Explanation is next given regarding the internal configuration of the automated transaction apparatus 10, with reference to FIG. 2. The internal configuration of the automated transaction apparatus 10 includes a storage unit 20, a controller 21, a document processor 22, a card processor 23, a banknote depositing and dispensing section 24, a banknote identification section 25, a coin deposit and dispensing section 26, a coin identification section 27, a storage processor 28, a banknote storage section 29, a counterfeit banknote storage section 29', a coin storage section 30, a counterfeit coin storage section 30', and a communication section 31.

The storage unit 20 stores various data required in processing with the automated transaction apparatus 10, such as for example: image data of various images for displaying on the rate providing section 12 and the transaction information providing section 17; text data for outputting various presentation information and speech with the rate providing section 12 and the transaction information providing section 17; rate data for each currency unit; and programs for execution by the controller 21. The storage unit 20 also stores a counterfeit currency processing table storing currency units of counterfeit currency associated with types of processing for counterfeit currency. The counterfeit currency processing table stores, for example, "retain" in association with "Euro", and stores "return" in association with other currency units. The content of the stored table is obviously not limited thereto.

The controller 21 controls each of the elements of the automated transaction apparatus 10. The controller 21 also controls transactions with users, namely, multi-currency transactions with users, based on data received from the banknote identification section 25 and the coin identification section 27. Examples of such transactions include, for example, deposit transactions, dispensing transactions, transfer transactions and exchange transactions. Details regarding processing of the controller 21 are given later.

The document processor 22 controls opening and closing of the document input-output port 13. The document processor 22 also reads various types of data from documents that have been inserted into the document input-output port 13, and outputs data related to the read contents to the controller 21. The document processor 22 also prints various types of information on documents that have been inserted into the document input-output port 13. The document processor 22 also ejects the documents from the document input-output port 13.

The card processor 23 controls opening and closing of the card input-output port 14. The card processor 23 also reads various types of data from cards inserted into the card input-output port 14, and outputs data relating to the read content to the controller 21. The card processor 23 stores various types of data on cards that have been inserted into the card input-output port 14. The card processor 23 also ejects cards from the card input-output port 14. The card processor 23 also includes a prepaid card storage section that stores prepaid cards. The card processor 23 stores various types of data on prepaid cards according to requests from the controller 21, and issues the prepaid cards to users. Note that such prepaid cards may also be ones already held by the user. In such cases, the controller 21 may be configured to prompt the user to insert a prepaid card when a need arises to store various types of data on the prepaid card.

The banknote depositing and dispensing section 24 controls opening and closing of the banknote input-output port 15 and also conveys inserted banknotes, which have been inserted into the banknote input-output port 15, to the storage processor 28. Namely, the banknote depositing and dispensing section 24 has a banknote conveying path, which is not shown in the drawings, and inserted banknotes are conveyed along the banknote conveying path. The banknote depositing and dispensing section 24 also conveys banknotes that have been placed on the banknote conveying path from the storage processor 28 to the banknote input-output port 15, and ejects the banknotes from the banknote input-output port 15.

The banknote identification section 25 is provided on the banknote conveying path for identifying inserted banknotes. Specifically, the banknote identification section 25 identifies the currency unit and denomination of inserted banknotes. The banknote identification section 25 ascertains the inserted banknotes to be counterfeit banknotes, namely forgeries, when the banknote identification section 25 is unable to identify the currency unit and/or denomination of the inserted banknotes. Configuration may be made such that a counterfeit banknote storage section 29' is disposed in the banknote identification section 25. The banknote identification section 25 outputs identification result data related to the identification results to the controller 21.

The coin deposit and dispensing section 26 controls opening and closing of the coin input-output port 16, and also conveys coins that have been inserted through the coin input-output port 16 to the storage processor 28. Namely, the coin deposit and dispensing section 26 includes a coin conveying path, which is not shown in the drawings, and inserted coins are conveyed on the coin conveying path.

The coin identification section 27 is provided on the coin conveying path for identifying the inserted coins. Specifically, the coin identification section 27 identifies the currency unit and denomination of the inserted coins. The coin identification section 27 ascertains the inserted coins to be counterfeit coins when the coin identification section 27 is unable to identify the currency unit and/or the denomination of the inserted coins. Configuration may be made such that the counterfeit coin storage section 30' is disposed in the coin identification section 27. The coin identification section 27 outputs identification result data related to the identification results to the controller 21. Inserted banknotes and inserted coins are referred to below collectively as "inserted currency". The counterfeit banknote storage section 29' and the counterfeit coin storage section 30' are similarly referred to collectively as "counterfeit currency storage section". Counterfeit banknotes and counterfeit coins are similarly referred to collectively as "counterfeit currency".

The storage processor 28 stores inserted banknotes that have been conveyed from the banknote depositing and dispensing section 24 in the banknote storage section 29, and stores inserted coins that have been conveyed from the coin deposit and dispensing section 26 in the coin storage section 30. Specifically, the banknote storage section 29 is provided one for each currency unit. For example, a banknote storage section **29*a* corresponds to US dollars, a banknote storage section 29*b* corresponds to Japanese yen, a banknote storage section 29*c* corresponds to Brazilian real (BRL), and a banknote storage section 29*d* corresponds to euros (EUR). There are four banknote storage sections 29 illustrated in FIG. 2; however, obviously configuration may be made with more or less than this number of banknote storage sections 29. Each of the banknote storage sections 29 has storage cassette(s) corresponding to each denomination of banknote. The storage processor 28 therefore first selects the banknote storage section 29 corresponding to the currency unit of the inserted banknote, and then selects the storage cassette corresponding to the denomination of the inserted banknote from the storage cassettes of the selected banknote storage section 29. The banknote storage section 29 stores the inserted banknote in the selected storage cassette. When in receipt of a dispensing instruction from the controller 21, the storage processor 28 takes out the banknote(s) from the storage cassette as designated by the controller 21, and places the banknote(s) on the banknote conveying path. Note that configuration may be made such that one banknote storage section 29 is provided for depositing, and one banknote storage section 29 is provided for dispensing. Such dispensing banknote storage sections 29 are provided one for each currency unit, similarly to as described above. In such configurations, the storage processor 28 stores inserted banknotes in the deposit banknote storage section 29**. Dispensing is performed similarly to as described above.

In this example, the coin storage section 30 is common to all the currency units. Namely, the storage processor 28 stores all the inserted coins in the coin storage section 30. However, obviously a similar configuration to that of the banknote storage sections 29 may also be adopted for coin storage sections 30.

The storage processor 28 stores forgeries (counterfeit banknotes) that have been conveyed from the banknote depositing and dispensing section 24 in the counterfeit banknote storage section 29', and stores counterfeit coins that have been conveyed from coin deposit and dispensing section 26 in the counterfeit coin storage section 30'.

The communication section 31 performs communication with a server 50 through a network 40, and thereby acquires various types of data from the server 50, such as rate data for each of the currency units. The communication section 31 stores rate data acquired from the server 50 in the storage unit 20. The server 50 computes rates for each currency unit corresponding to the installation location of the automated transaction apparatus 10 and stores the computation results. When a rate is requested by the automated transaction apparatus 10, the server 50 transmits the stored rate to the automated transaction apparatus 10. Further, the server 50 also stores account numbers and respective PINs, associated with each other.

2. Processing Sequence of Automated Transaction Apparatus

Explanation follows regarding a processing sequence with the automated transaction apparatus 10, with reference to the flow charts of FIG. 3 to FIG. 8. In parallel to the following processing, the controller 21 also provides rates corresponding to the installation location of the automated transaction apparatus 10 to the rate providing section 12 for each of the currency units. The communication section 31 periodically requests rate data from the server 50, and stores in the storage unit 20 rate data that has been transmitted in response from the server 50.

Overall Processing

Figure 3:
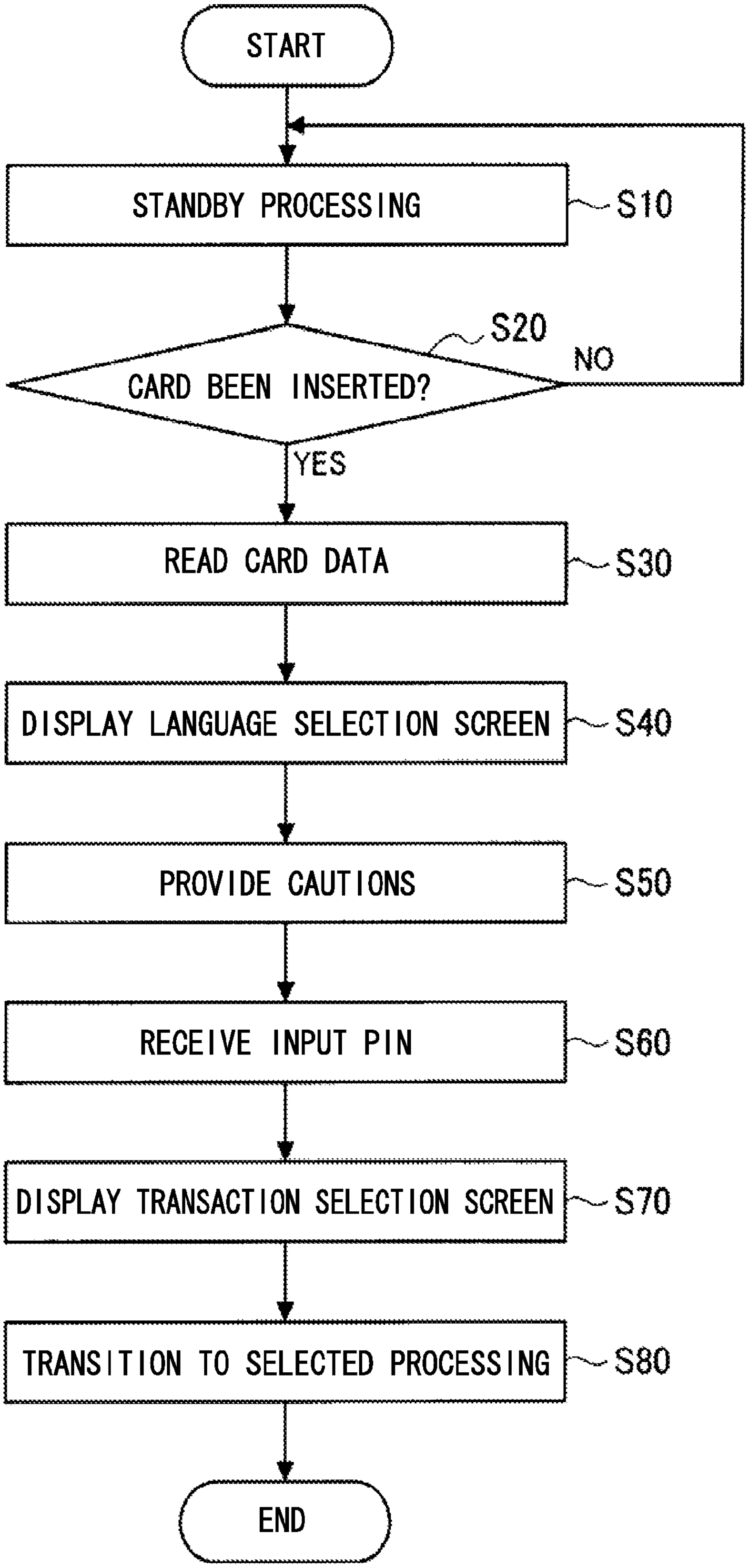
FIG. 3 is a flowchart illustrating a processing sequence according to the automated transaction apparatus.

Explanation first follows regarding overall processing performed by the automated transaction apparatus 10, with reference to FIG. 3. At step S10, the controller 21 performs standby processing. For example, the controller 21 displays a standby image on the transaction information providing section 17. The standby image displays, for example, guidance prompting a user to insert a cash card. As well as guidance, the standby image may also be configured to display a transaction selection button P2 for "Exchange", as described later. The controller 21 transitions to the exchange transaction, as described later, when the user touches the transaction selection button P2 for "Exchange".

At step S20, the card processor 23 determines whether or not a cash card has been inserted into the card input-output port 14. Processing proceeds to step S30 when it is determined that a cash card has been inserted; however, processing returns to step S10 when it is determined that no cash card has been inserted.

At step S30, the card processor 23 reads in various types of data from the cash card that has been inserted through the card input-output port 14, such as for example the account name, account number, PIN, currency unit of the currency deposited in the account (referred to below as "account currency unit").

Figure 9:
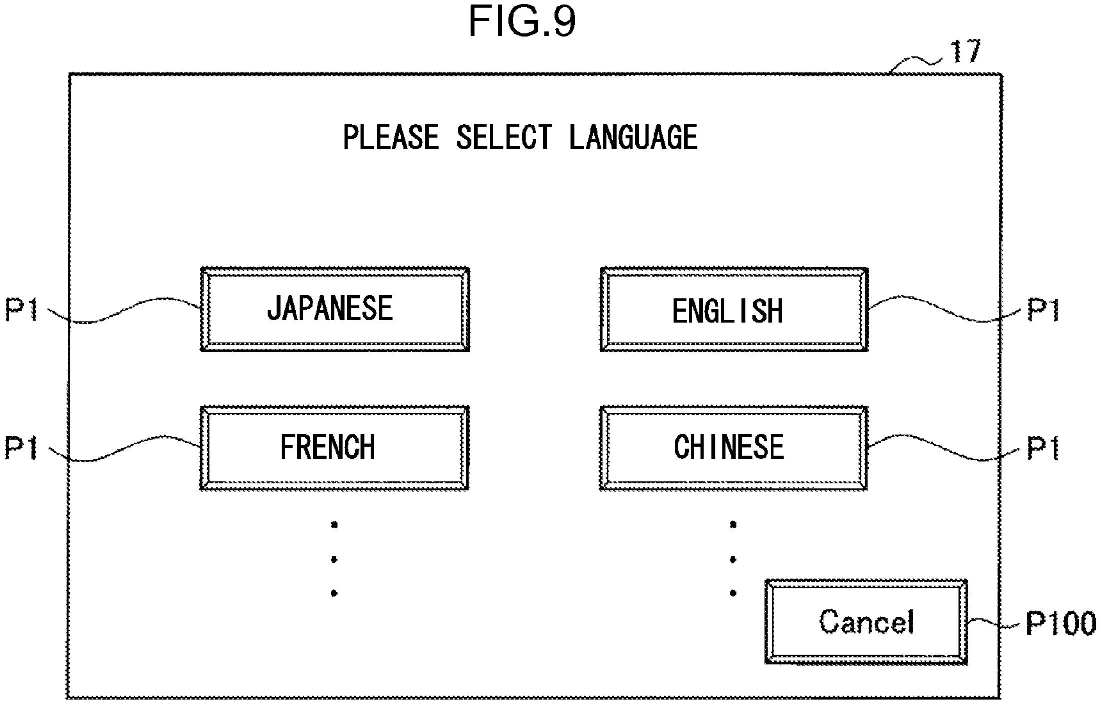
FIG. 9 is an example of a screen (screen image) displayed by the automated transaction apparatus.

At step S40, the card processor 23 outputs the read data, namely the cash card data, to the controller 21. The controller 21 stores the cash card data in the storage unit 20 and causes a language selection screen such as illustrated in FIG. 9 to be displayed on the transaction information providing section 17. The language selection screen includes plural language selection buttons P1 and a cancel button P100. Characters indicating the different languages are depicted on each of the language selection buttons P1. The cancel button P100 is a button for the user to cancel the transaction. The language selection screen illustrated in FIG. 9 has language selection buttons P1 for "Japanese", "English", "French" and "Chinese"; however, obviously the configuration may include language selection buttons P1 corresponding to other languages.

The user may touch the language selection button P1 corresponding to the desired language from the language selection buttons P1. However, if the user wishes to cancel the transaction, the user may touch the cancel button P100. The input section 18 outputs operation data corresponding to the user's input operation to the controller 21. The controller 21 thereby ascertains the language the user has selected, or whether the transaction has been cancelled. The controller 21 proceeds to step S50 when ascertained that the user has selected a language. From step 50 onwards, the controller 21 provides various types of data to the transaction information providing section 17 in the language selected by the user. However, when ascertained that the transaction has been cancelled, the controller 21 outputs card return data to the card processor 23 and based on the card return data the card processor 23 returns the cash card through the card input-output port 14. The controller 21 then returns to step S10. In the processing described below, similar processing to the above is performed whenever the user presses the cancel button P100.

At step S50, the controller 21 provides various transaction cautions to the transaction information providing section 17.

At step S60, the controller 21 receives an input of PIN. Specifically, the controller 21 displays a ten-key on the transaction information providing section 17. The user may then input their PIN by touching the ten-key. The input section 18 outputs PIN data relating to the input PIN to the controller 21. The controller 21 outputs PIN interrogation data, in which PIN data and respective account number data associated with each other, to the communication section 31. The communication section 31 transmits the PIN interrogation data to the server 50. The server 50 determines whether the PIN that has been input by the user is correct based on the PIN interrogation data (namely whether the PIN matches the PIN stored in the server 50). The server 50 transmits determination result data related to the determination result to the automated transaction apparatus 10, and the communication section 31 outputs the received determination result data to the controller 21. The controller 21 determines whether the PIN that has been input by the user is correct based on the determination result data, and the processing proceeds to step S70 when the PIN is determined to be correct, and the processing of S60 is repeated when the PIN is determined to be incorrect. Configuration may be made such that data of associated account numbers and PINs are stored in the storage unit 20. In such cases, the controller 21 can determine whether or not the PIN is correct based on such data stored in the storage unit 20.

Figure 10:
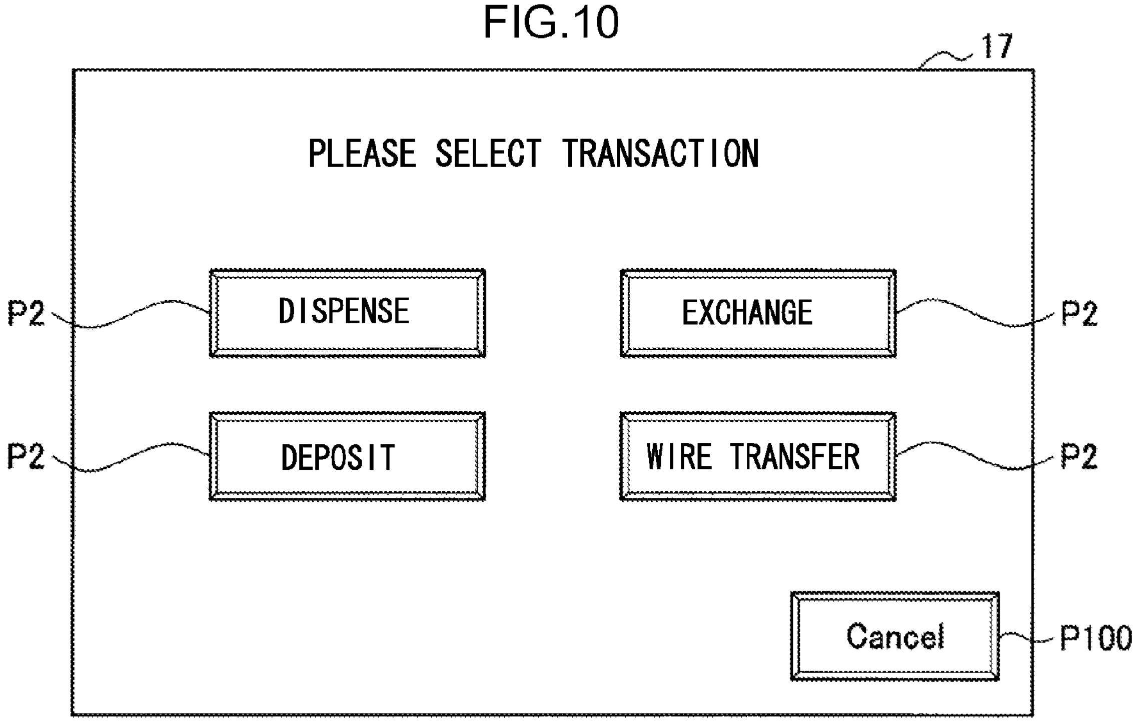
FIG. 10 is an example of a screen displayed by the automated transaction apparatus.

At step S70, the controller 21 causes a transaction selection screen such as that illustrated in FIG. 10 to be displayed on the transaction information providing section 17. The transaction selection screen includes plural transaction selection buttons P2 and a cancel button P100. Characters indicating the type of transaction are depicted on the transaction selection buttons P2. The user may touch the transaction selection button P2 corresponding to the desired transaction from out of the transaction selection buttons P2. The input section 18 outputs operation data corresponding to the user's input operation to the controller 21. The controller 21 thereby ascertains the transaction that has been selected by the user. The controller 21 then proceeds to step S80 when the transaction selected by the user has been ascertained. The transaction selection screen illustrated in FIG. 10 includes transaction selection buttons P2 corresponding to "Dispense", "Exchange", "Deposit", and "Wire Transfer" as the transaction selection buttons P2. However, obviously transaction selection buttons P2 corresponding to other transactions may be included in the transaction selection buttons P2. At step S80, the controller 21 proceeds to the transaction that has been selected by the user.

Dispensing Transaction

Figure 4:
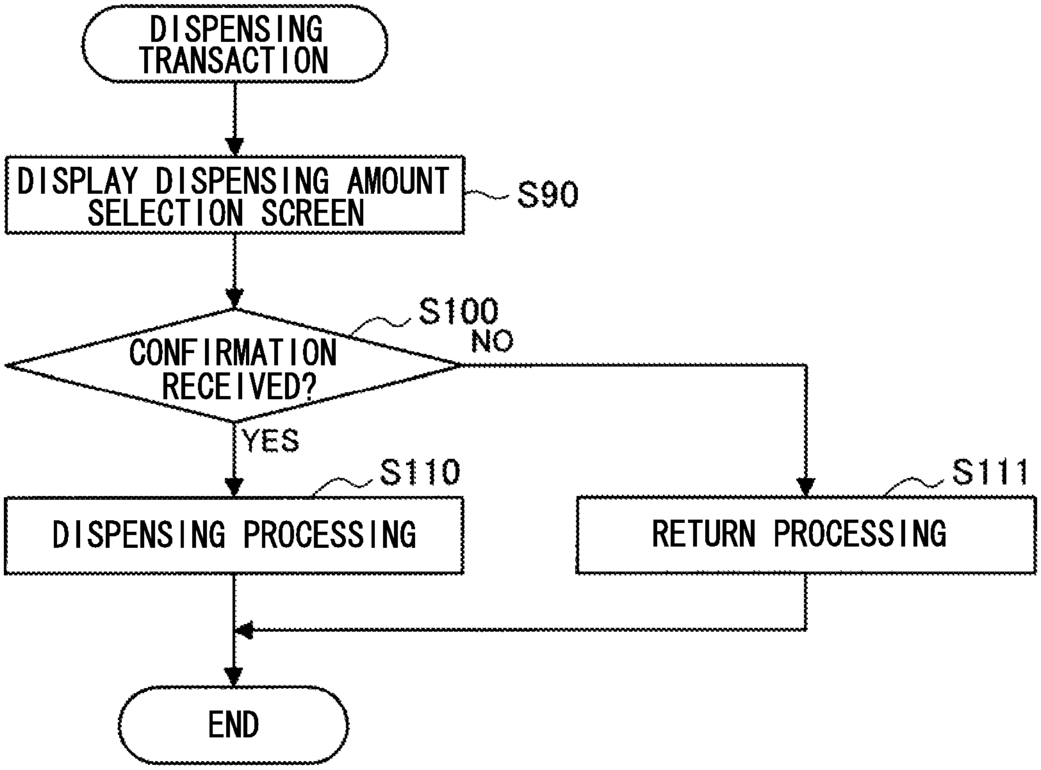
FIG. 4 is a flowchart illustrating a processing sequence according to the automated transaction apparatus.

Explanation follows regarding a dispensing transaction performed by the automated transaction apparatus 10, with reference to FIG. 4. The dispensing transaction is performed when a user has selected "Dispense".

Figure 11:
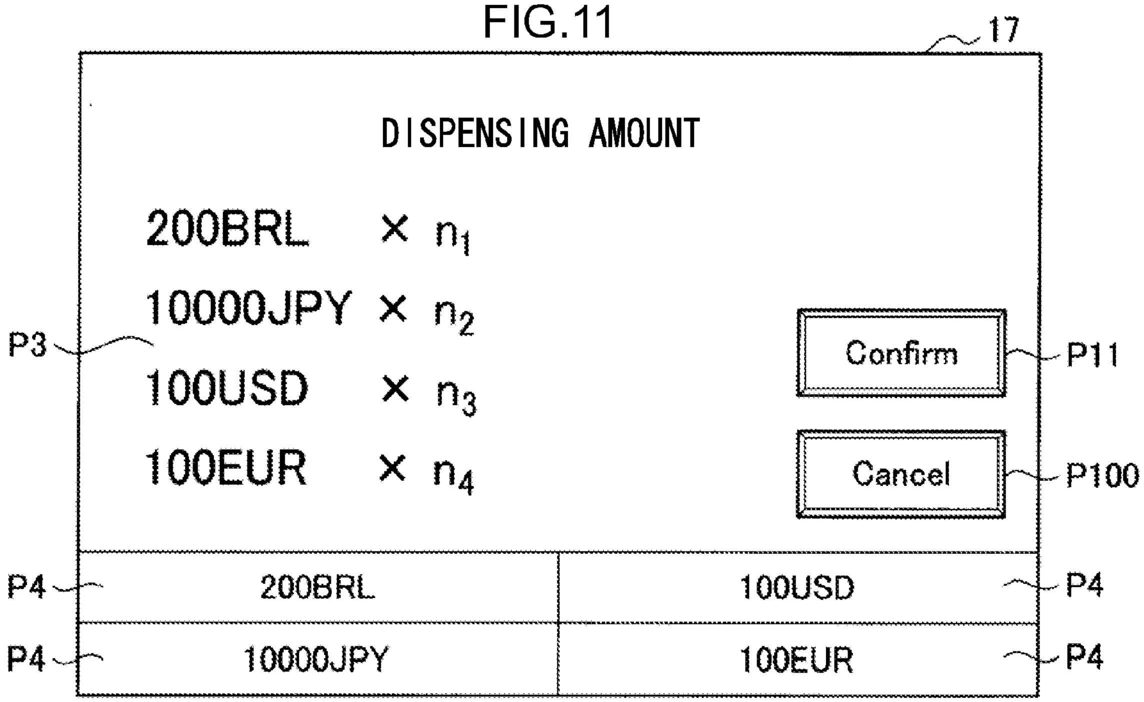
FIG. 11 is an example of a screen displayed by the automated transaction apparatus.

At step S90, the controller 21 causes a dispensing amount selection screen such as that illustrated in FIG. 11 to be displayed on the transaction information providing section 17. The dispensing amount selection screen includes a dispensing amount display area P3, a dispensing banknote selection button P4, a confirmation button (OK button) P11, and a cancel button P100. Dispensing banknotes (namely the banknotes to be dispensed) and the dispensing note number (namely the number of banknotes to be dispensed) are displayed in association with each other in the dispensing amount display area P3. The present example shows the dispensing banknotes as 200 Brazilian real, 10000 Japanese yen, 100 US dollars, and 100 euros, and the dispensing note numbers are respectively "$n_1$" to "$n_4$" (wherein $n_1$ to $n_4$ are integers of 0 or greater). Characters indicating the type of dispensing banknote are depicted on the dispensing banknote selection button P4. The dispensing amount selection image illustrated in FIG. 11 includes the dispensing banknote selection buttons P4 corresponding respectively to "200 Brazilian Real", "10000 Japanese yen", "100 US dollars" and "100 euros"; however, obviously dispensing banknote selection buttons P4 may be included that correspond to other dispensing banknotes.

The user then touches the desired dispensing banknote selection button P4. The input section 18 outputs operation data corresponding to the user's input operation to the controller 21. The controller 21 thereby ascertains the dispensing banknotes that have been selected by the user, and increments by 1 the dispensing note number corresponding to the identified dispensing banknote. The controller 21 associates and stores the dispensing banknote and the dispensing note number in the storage unit 20.

The confirmation button P11 is a button for the user to confirm the dispensing amount. The user may touch the confirmation button P11 when the user wishes to confirm the dispensing amount. The input section 18 outputs operation data corresponding to the user's input operation to the controller 21. Based on the operation data, the controller 21 thereby ascertains that the user has confirmed the dispensing amount.

At step S100, the controller 21 determines whether the user has touched a button based on the operation data. The controller 21 proceeds to step S110 when it is determined that the user has touched the confirmation button P11, and proceeds to step S111 when it is determined that the user has touched the cancel button P100.

At step S110, the controller 21 acquires rate data and cash card data from the storage unit 20, and, based on the acquired data, computes the rate in the account currency unit for the dispensing currency unit that is the currency unit of the dispensing banknotes. The controller 21 then computes an individual dispensing amount by multiplying the dispensing banknote denomination by the computed rate and by the respective dispensing note number. The controller 21 computes individual dispensing amounts for all of the dispensing banknotes, and then computes the account deduction amount by adding the computed individual dispensing amounts together. The controller 21 then deducts (withdraws) currency of the account deduction amount from the account of the user.

The controller 21 then outputs dispensing data relating to the dispensing banknotes and the dispensing note number to the storage processor 28. The storage processor 28 takes out from the banknote storage section 29 dispensing banknotes up to the dispensing note number and places them on the banknote conveying path. The banknote depositing and dispensing section 24 conveys the banknote(s) on the banknote conveying path to the banknote input-output port 15, and ejects (dispenses) the banknotes from the banknote input-output port 15. The controller 21 outputs to the document processor 22 receipt issue instruction data including data related to the dispensing banknotes, the dispensing note number and the account deduction amount. The document processor 22 then issues a receipt on which the dispensing banknotes, the dispensing note number, and the account deduction amount are written, and dispenses the receipt to the user. At step S111, the controller 21 outputs card return instruction data to the card processor 23, and the card processor 23 returns the cash card to the user based on the card return instruction data. The controller 21 then ends dispensing processing.

Modified Example of Dispensing Transaction

Figure 12:
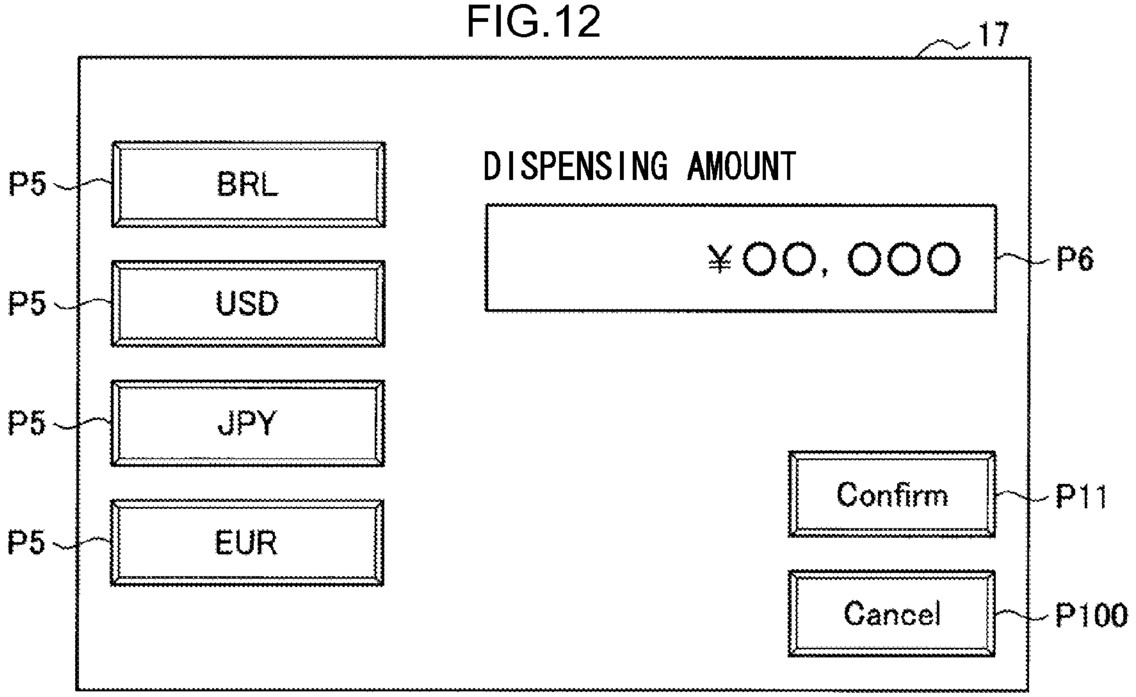
FIG. 12 is an example of a screen displayed by the automated transaction apparatus.

Explanation follows regarding a modified example of the dispensing transaction. At step S90 in the modified example, the controller 21 displays a dispensing amount selection screen such as that illustrated in FIG. 12. In the present example, the dispensing amount selection screen includes currency unit selection buttons P5, a dispensing amount display area P6, a confirmation button P11, a cancel button P100, and a ten key, which is not shown in the drawings. Characters indicating the type of currency unit are depicted on the currency unit selection buttons P5. The dispensing amount selection screen illustrated in FIG. 12 includes currency unit selection buttons P5 corresponding to "Brazilian real", "US dollar", "Japanese yen" and "Euro"; however, obviously currency unit selection buttons P5 that correspond to other currency units may be included. The dispensing amount display area P6 displays the user dispensing amount, namely, the monetary amount of the currency to be dispensed to the user.

The user may touch the desired currency unit selection button P5. The input section 18 outputs operation data corresponding to the user's input operation to the controller 21. The controller 21 thereby ascertains a selected currency unit that has been selected by the user. The user may input a desired value by touching the ten key. The input section 18 outputs operation data corresponding to the user's input operation to the controller 21. The controller 21 thereby ascertains a dispensing amount reference value that is the value that has been input by the user. The controller 21 identifies a monetary amount of the dispensing amount reference value expressed by the selected currency unit as the user dispensing amount, and determines whether it is possible to dispense the user dispensing amount completely in banknotes. The controller 21 stores the user dispensing amount in the storage unit 20 when, as a result of determination, the controller 21 determines that it is possible to dispense the user dispensing amount completely in banknotes. The controller 21 also causes the user dispensing amount to be displayed in the dispensing amount display area P6. However, when the controller 21 has determined that it is not possible to dispense at least a portion of the user dispensing amount in banknotes, the controller 21 discards the dispensing amount reference value and displays that a portion of the user dispensing amount cannot be dispensed in banknotes in the dispensing amount display area P6. The controller 21 thereby prompts the user to re-input a dispensing amount reference value. The confirmation button P11 is similar to that explained with respect to FIG. 11.

At step S100, the controller 21 determines which button the user has touched based on the operation data. The controller 21 proceeds to step S110 when it is determined that the user has touched the confirmation button P11, and proceeds to step S111 when it is determined that the user has touched the cancel button P100.

At step S110, the controller 21 acquires rate data and cash card data from the storage unit 20 and computes a rate in the account currency unit for the selected currency unit based on the acquired data. The controller 21 then computes an account deduction amount by multiplying the user dispensing amount by the computed rate. The controller 21 deducts currency of the account deduction amount from the account of the user.

The controller 21 outputs dispensing data relating to the user dispensing amount to the storage processor 28. The storage processor 28 takes out banknote(s) corresponding to the selected currency unit up to the user dispensing amount from the banknote storage section 29 and places the banknotes on the banknote conveying path. The banknote depositing and dispensing section 24 conveys the banknotes on the banknote conveying path to the banknote input-output port 15, and ejects (dispenses) the banknotes from the banknote input-output port 15. The controller 21 also outputs receipt issue instruction data including data related to the user dispensing amount and the account deduction amount. The document processor 22 then issues a receipt on which such items as the user dispensing amount and the account deduction amount are written, and dispenses the receipt to the user. At step S111, the controller 21 outputs card return instruction data to the card processor 23, and the card processor 23 returns the cash card to the user based on the card return instruction data. The controller 21 then ends dispensing processing.

Deposit Transaction

Figure 5:
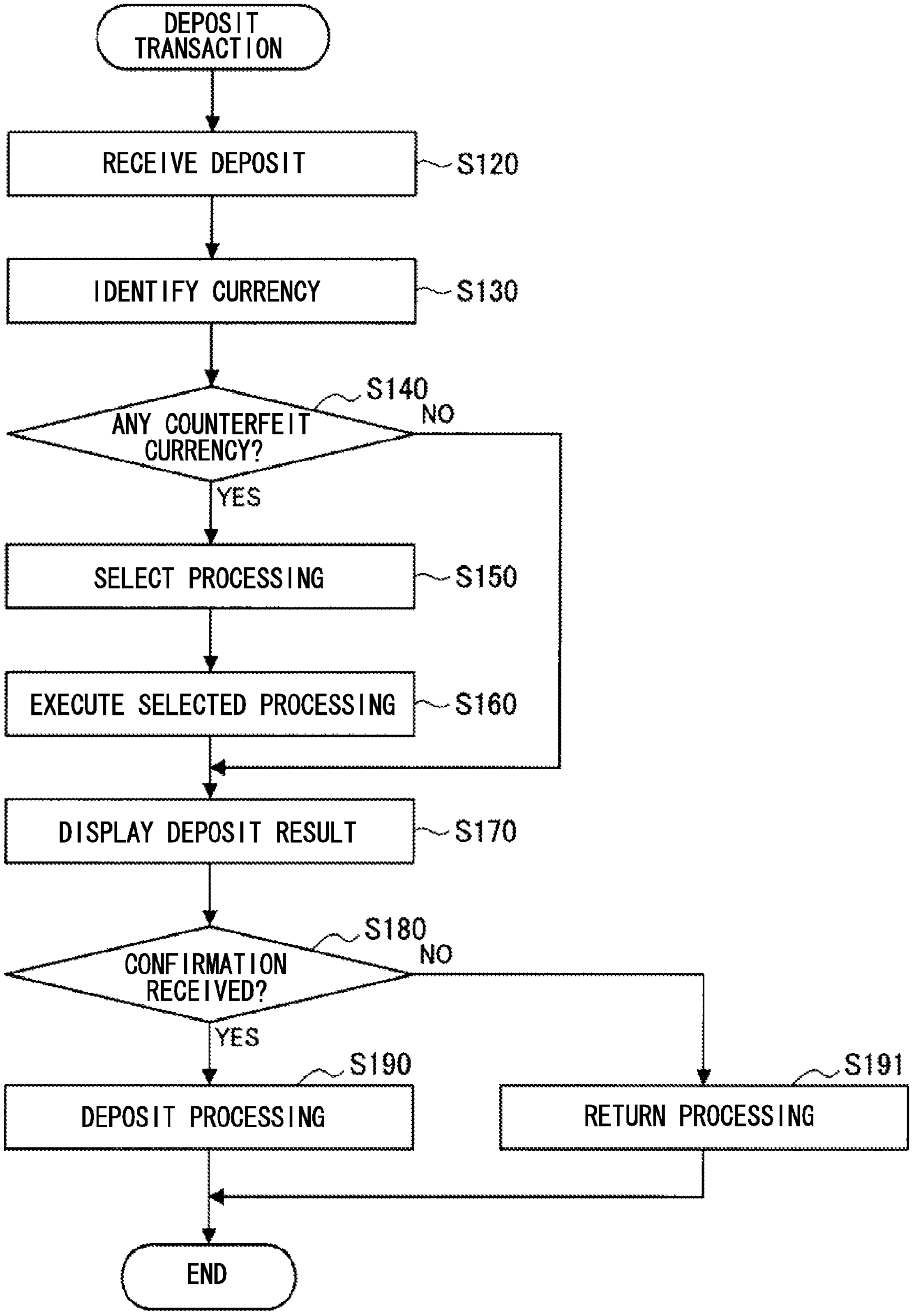
FIG. 5 is a flowchart illustrating a processing sequence according to the automated transaction apparatus.

Explanation follows regarding a deposit transaction performed by the automated transaction apparatus 10, with reference to FIG. 5. A deposit transaction is performed when a user has selected “Deposit”.

At step S120, the banknote depositing and dispensing section 24 and the coin deposit and dispensing section 26 receive currency inserted by the user. Specifically, the banknote depositing and dispensing section 24 and the coin deposit and dispensing section 26 open the banknote input-output port 15 and the coin input-output port 16. The user may then insert banknotes as desired into the banknote input-output port 15. When doing so, the user may insert plural types of banknote of mutually different currency units all at once. The user may also insert coins as desired into the coin input-output port 16 when the user desires to perform coin depositing. The user may also insert plural types of coins of mutually different currency unit all at once.

At step S130, the banknote depositing and dispensing section 24 closes the banknote input-output port 15 after banknotes have been inserted into the banknote input-output port 15, and then conveys the inserted banknotes to the banknote identification section 25. The banknote identification section 25 identifies the currency unit and denomination of each of the inserted banknotes on the conveying path. The banknote identification section 25 ascertains the inserted banknotes to be forgeries if the banknote identification section 25 is unable to ascertain the currency unit and/or denomination of any of the inserted banknotes. The banknote identification section 25 outputs identification result data related to the identification results to the controller 21.

The coin deposit and dispensing section 26 closes the coin input-output port 16 after coins have been inserted into the coin input-output port 16, and conveys the inserted coins to the coin identification section 27. The coin identification section 27 identifies the currency unit and denomination of each of the inserted coins on the conveying path. The coin identification section 27 ascertains the inserted coins to be counterfeit coins when the coin identification section 27 is unable to ascertain the currency unit and/or denomination of any of the inserted coins. The coin identification section 27 outputs identification result data related the identification results to the controller 21.

At step S140, the controller 21 determines whether or not there is any counterfeit currency present based on the identification result data input from the banknote identification section 25 and the coin identification section 27. The controller 21 proceeds to step S150 if it is determined that there is counterfeit currency present, and proceeds to step S170 if it is determined that there is no counterfeit currency present.

At step S150, the controller 21 determines a type of processing for the counterfeit currency separately for each currency unit of counterfeit currency based on the counterfeit currency processing table. For example, the controller 21 determines the type of processing for the counterfeit currency as “retain” when the currency unit of the counterfeit currency is Euro, and determines the type of processing for the counterfeit currency “return” when the currency unit of the counterfeit currency is anything other than Euro.

At step S160, the controller 21 executes the processing that has been determined at step S150. Specifically, the controller 21 outputs retain instruction data to the banknote depositing and dispensing section 24 and/or the coin deposit and dispensing section 26 when “retain” has been selected as the processing for the counterfeit currency. The banknote depositing and dispensing section 24 and the coin deposit and dispensing section 26 then convey the counterfeit currency to the storage processor 28 based on the retain instruction data. The storage processor 28 stores the counterfeit currency in the corresponding storage section. Namely, the storage processor 28 stores counterfeit banknotes in the counterfeit banknote storage section 29' and counterfeit coins in the counterfeit coin storage section 30'.

However, when “return” has been selected as the type of processing for the counterfeit currency, the controller 21 outputs return instruction data to the banknote depositing and the dispensing section 24 and/or the coin deposit and dispensing section 26. The banknote depositing and dispensing section 24 and the coin deposit and dispensing section 26 return the counterfeit currency from the banknote input-output port 15 and/or the coin input-output port 16 based on the return instruction data. Configuration may be made such that when counterfeit currency is present, the controller 21 notifies the user that counterfeit currency is present and notifies the user of the type of processing for the counterfeit currency. For example, the controller 21 may generate text information such as “Counterfeit currency detected. Retaining counterfeit currency” to be presented on the transaction information providing section 17.

Figure 13:
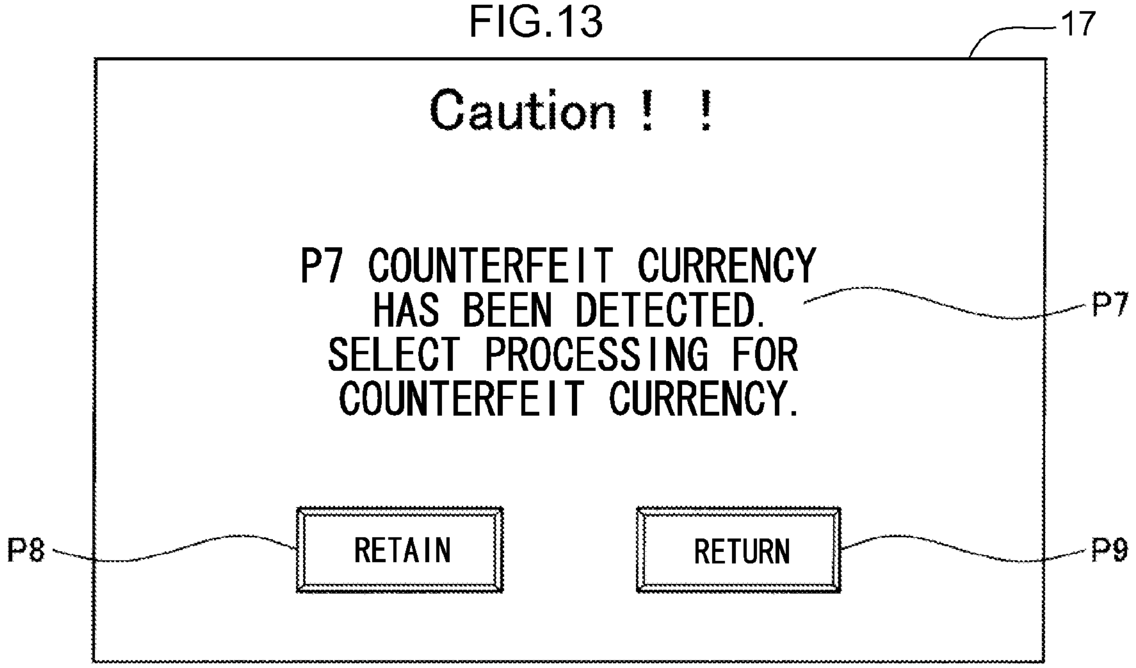
FIG. 13 is an example of a screen displayed by the automated transaction apparatus.

The controller 21 may also be configured so as to allow the user to select a type of processing for the counterfeit currency. In such cases, the controller 21 causes a counterfeit currency processing selection screen such as that illustrated in FIG. 13 to be displayed at step S150. The counterfeit currency processing selection screen includes a text image P17 for notifying the presence of counterfeit currency, a retain selection button P8, and a return selection button P9. The retain selection button P8 is a button for selecting "retain" as the type of processing for the counterfeit currency. The return selection button P9 is a button for selecting "return" as the type of processing for the counterfeit currency. The user can be made aware that there is counterfeit currency in the inserted currency by viewing the screen. The user may then touch the button corresponding to the desired processing, from the retain selection button P8 and the return selection button P9. The input section 18 outputs operation data corresponding to the user's input operation to the controller 21.

At step S160, the controller 21 then performs the processing that has been selected by the user based on the operation data. Specifically, the controller 21 outputs retain instruction data to the banknote depositing and dispensing section 24 and/or the coin deposit and dispensing section 26 if "retain" has been selected by the user as the type of processing for the counterfeit currency. The banknote depositing and dispensing section 24 and/or the coin deposit and dispensing section 26 then convey the counterfeit currency to the storage processor 28 based on the retain instruction data. The storage processor 28 then stores the counterfeit currency in the corresponding storage section. The storage processor 28 stores counterfeit banknotes in the counterfeit banknote storage section 29' and counterfeit coins in the counterfeit coin storage section 30'.

If the user has selected "return", the controller 21 outputs return instruction data to the banknote depositing and dispensing section 24 and/or the coin deposit and dispensing section 26. The banknote depositing and dispensing section 24 and/or the coin deposit and dispensing section 26 then return the counterfeit currency from the banknote input-output port 15 and/or the coin input-output port 16 based on the return instruction data. Configuration may be made such that when there are plural items of counterfeit currency present, the controller 21 allows the user to select how the counterfeit currency items are to be handled all at once, or allows the user to select how to handle each of the counterfeit currency items separately.

Figure 14:
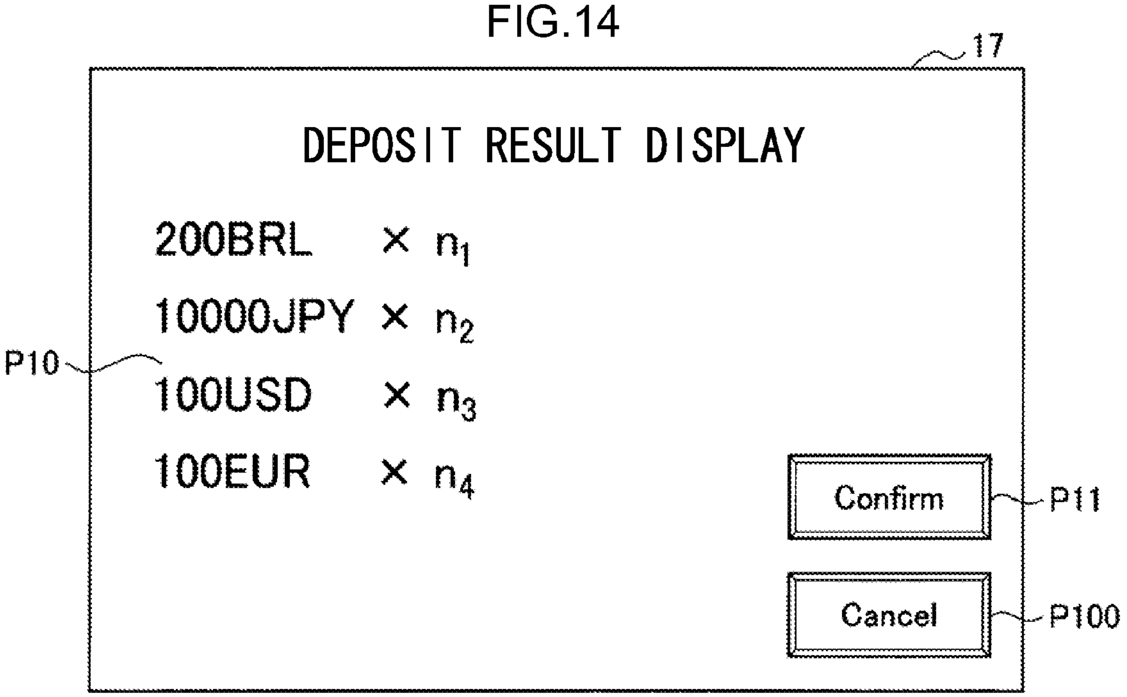
FIG. 14 is an example of a screen displayed by the automated transaction apparatus.

At step S170, based on the determination result data the controller 21 then causes a deposit result screen such as that illustrated in FIG. 14 to be displayed. The deposit result screen includes a deposit currency display area P10 for displaying the inserted currency and the number of items of inserted currency (individual number), a confirmation button P11 and a cancel button P100. In this example, there are $n_1$ notes of 200 Brazilian real, $n_2$ notes of 10000 Japanese yen, $n_3$ notes of 100 US dollar, and $n_4$ notes of 100 euros inserted. The user may touch the confirmation button P11 unless they disagree with the content displayed, and may touch the cancel button P100 to cancel the transaction. The input section 18 outputs operation data corresponding to the user's input operation to the controller 21.

At step S180, the controller 21 determines which button the user has pressed based on the operation data. The controller 21 proceeds to step S190 when it is determined that the user has touched the confirmation button P11, and proceeds to step S191 when it is determined that the user has touched the cancel button P100.

The controller 21 performs deposit processing at step S190. Specifically, the controller 21 outputs conveying instruction data to the banknote depositing and dispensing section 24 and/or the coin deposit and dispensing section 26. Based on the conveying instruction data, the banknote depositing and dispensing section 24 and/or the coin deposit and dispensing section 26 then convey the inserted currency that is temporarily being held in the banknote identification section 25 and/or the coin identification section 27 to the storage processor 28. The storage processor 28 stores the inserted currency in the banknote storage section 29 and/or the coin storage section 30.

The controller 21 also acquires rate data and cash card data from the storage unit 20. Based on the acquired data, the controller 21 then computes a rate in the account currency unit against the currency unit of the inserted currency (a monetary amount in the account currency unit for a unit amount of the inserted currency). The controller 21 computes a deposit amount by multiplying the computed rate with the inserted currency amount, and deposits currency of the value of the deposit amount into the account of the user. The controller 21 outputs receipt issue instruction data including data related to the deposit amount to the document processor 22. The document processor 22 issues a receipt on which items such as the deposit amount are written, and dispenses the receipt to the user. The controller 21 also outputs card return instruction data to the card processor 23, and the card processor 23 then returns the cash card to the user based on the card return instruction data. The controller 21 then ends deposit processing. Configuration may be made such that the controller 21 performs the following processing instead of depositing currency of the value of the deposit amount in the account of the user. The controller 21 outputs prepaid card issue instruction data including data related to the deposit amount to the document processor 22. The document processor 22 takes a prepaid card from a prepaid card storage section, stores data relating to the deposit amount on the prepaid card, and dispenses the prepaid card to the user. The user is then able to take the prepaid card to a financial institution such as a bank and exchange the prepaid card value for cash.

At step S191, the controller 21 outputs card return instruction data to the card processor 23, and currency return instruction data to the banknote depositing and dispensing section 24 and/or the coin deposit and dispensing section 26. The card processor 23 returns the cash card to the user based on the card return instruction data. Based on the currency return instruction data, the banknote depositing and dispensing section 24 and/or the coin deposit and dispensing section 26 return the inserted currency that is being temporarily held in the banknote identification section 25 and/or the coin identification section 27 to the user. Configuration may be made such that, for example, for the value of the coin amount of inserted currency, the controller 21 returns this amount to the user using a prepaid card such as that referred to above. Processing of the storage processor 28 is simplified by adopting such a configuration. The controller 21 then ends deposit processing.

Exchange Transaction

Figure 6:
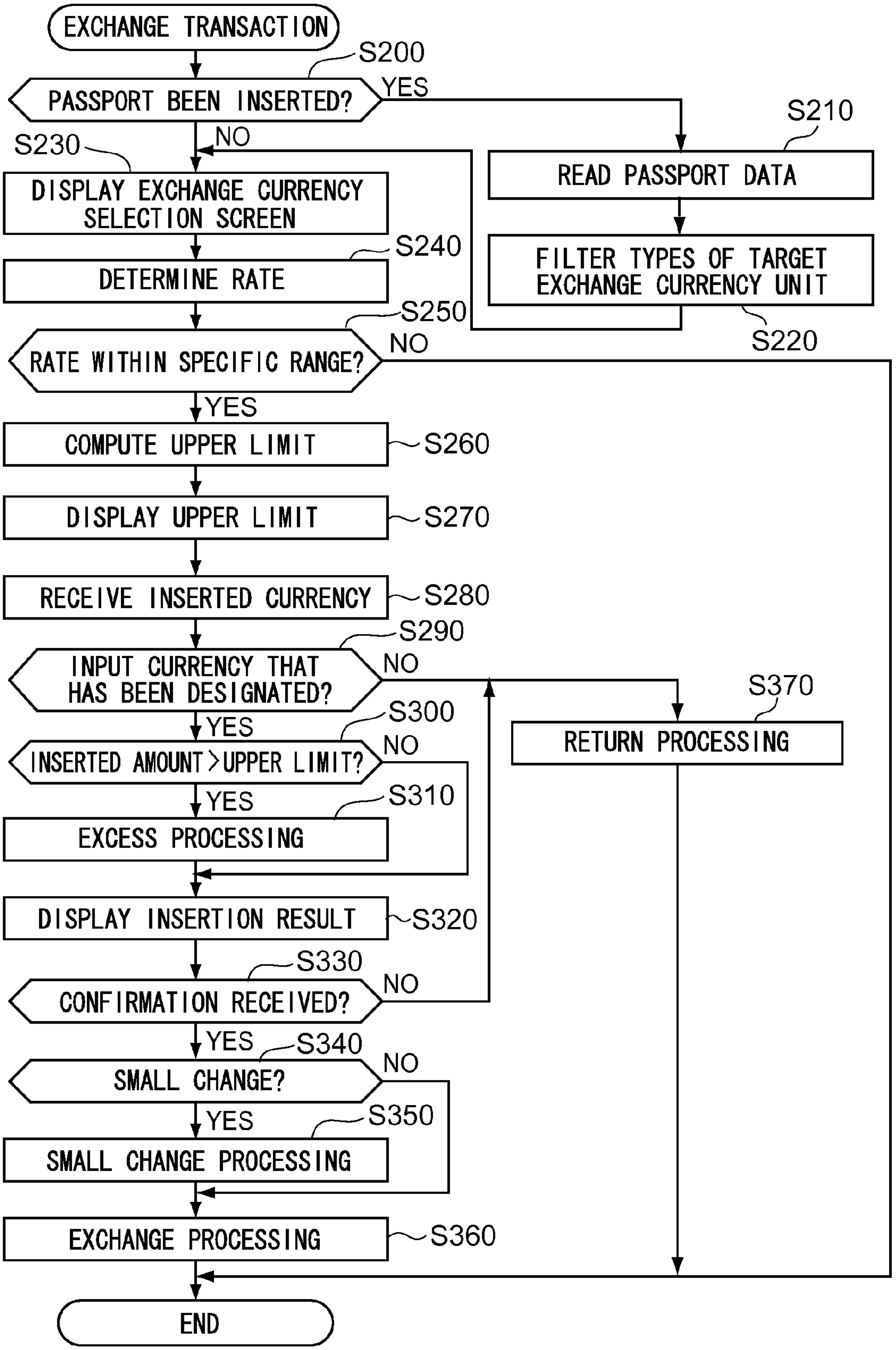
FIG. 6 is a flowchart illustrating a processing sequence according to the automated transaction apparatus.

Explanation follows regarding an exchange transaction performed by the automated transaction apparatus 10, with reference to FIG. 6. Exchange transactions are performed when a user has selected "Exchange". In outline, an exchange transaction is a transaction in which a source exchange currency that is the inserted currency is swapped (exchanged) for a target exchange currency that is a currency of different currency unit to that of the exchange currency. In the following, the currency unit of the source exchange currency is referred to as the "source exchange currency unit", and the currency unit of the target exchange currency is referred to as the "target exchange currency unit".

At step S200, the document processor 22 determines whether or not a passport has been inserted into the document input-output port 13. Processing proceeds to step S210 when it is determined that a passport has been inserted into the document input-output port 13. However, when it is determined that a passport has not yet been inserted into the document input-output port 13, passport non-insertion data expressing the lack of passport insertion is output to the controller 21. When in receipt of passport non-insertion data, the controller 21 determines, as source exchange currency unit candidates, the currency units the automated transaction apparatus 10 is capable of handling (the currency units stored in the banknote storage section 29). The controller 21 then proceeds to step S230.

At step S210, the document processor 22 reads in at least nationality data relating the nationality of the user from the data stored on the passport, and outputs the read data to the controller 21. The controller 21 stores the nationality data in the controller 21, and based on the nationality data, the controller 21 ascertains the user's national currency unit that is the currency unit employed in the country of the user's nationality.

At step S220, the controller 21 determines an installation location currency unit that is the currency unit in the region where the automated transaction apparatus 10 is installed and the user's national currency unit as target exchange currency unit candidates.

Figure 15:
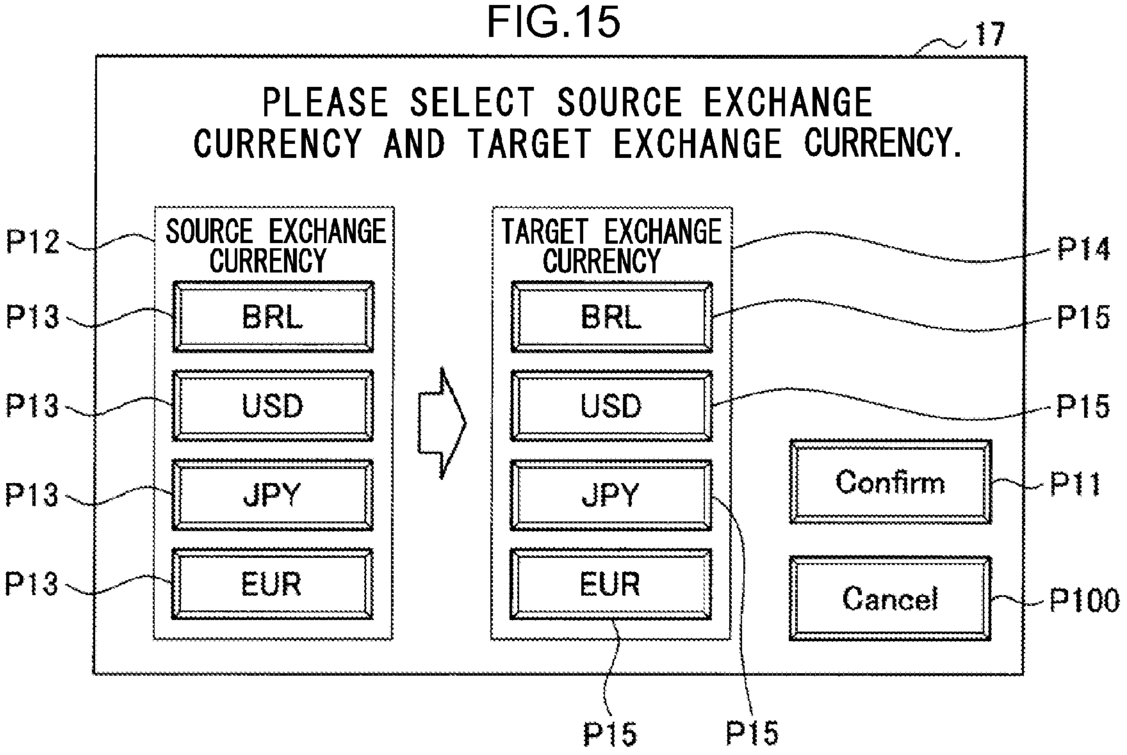
FIG. 15 is an example of a screen displayed by the automated transaction apparatus.

At step S230, the controller 21 causes an exchange currency selection screen such as illustrated in FIG. 15 to be displayed on the transaction information providing section 17. The exchange currency selection screen includes a source exchange currency unit selection area P12, a target exchange currency unit selection area P14, a confirmation button P11, and a cancel button P100. Source exchange currency unit selection buttons P13 are displayed in the source exchange currency unit selection area P12, and target exchange currency unit selection buttons P15 are displayed in the target exchange currency unit selection area P14.

Characters indicating the type of the source exchange currency unit candidates are depicted on the source exchange currency unit selection buttons P13. The source exchange currency unit selection buttons P13 are buttons operated by the user to select a source exchange currency unit from among the source exchange currency unit candidates. The exchange currency selection image illustrated in FIG. 15 is an example in which the source exchange currency unit candidates are "Brazilian real", "US dollar", "Japanese yen" and "Euro"; however, obviously other currency units may be employed as the source exchange currency unit candidates.

Characters indicating the type of the target exchange currency unit candidates are depicted on the target exchange currency unit selection buttons P15. The target exchange currency unit selection buttons P15 are buttons operated by the user to select a target exchange currency unit from among the target exchange currency unit candidates. The exchange currency selection image illustrated in FIG. 15 is an example including "Brazilian real", "US dollar", "Japanese yen" and "Euro" as target exchange currency unit candidates.

The user may select the source exchange currency unit from the source exchange currency unit candidates by touching the desired source exchange currency unit selection button P13. The input section 18 outputs operation data corresponding to the user's input operation to the controller 21. The controller 21 thereby ascertains the source exchange currency unit that has been selected by the user. Similarly, the user may selects the desired target exchange currency unit from out of the target exchange currency unit candidates by touching the desired target exchange currency unit selection button P15. The input section 18 outputs operation data corresponding to the user's input operation to the controller 21. The controller 21 thereby ascertains the target exchange currency unit that has been selected by the user.

After selecting the source exchange currency unit and the target exchange currency unit, the user may then touch the confirmation button P11. The input section 18 outputs operation data corresponding to the user's input operation to the controller 21. The controller 21 thereby ascertains that the source exchange currency unit and the target exchange currency unit that have been confirmed by the user. The controller 21 then proceeds to step S240.

At step S240, the controller 21 acquires rate data from the storage unit 20 and, based on the acquired rate data, computes an exchange target rate that is a rate in the target exchange currency unit against the source exchange currency unit.

At step S250, the controller 21 determines whether or not the exchange target rate is within a specific range. When it is determined that the exchange target rate is within a specific range, the controller 21 proceeds to step S260, and when it is determined that the exchange target rate is outside of the specific range, the controller 21 outputs card return instruction data to the card processor 23. The card processor 23 returns the cash card to the user based on the card return instruction data. The controller 21 then ends exchange transaction processing. The specific range is set for each combination of source exchange currency unit and target exchange currency unit. The width of the specific range depends on factors such as the stability of the rate of the currency. For example, a currency unit rate of low volatility has a narrower specific range than that of currency unit rate of high volatility. The reason such an approach is adopted is in consideration of the fact that distortions in rate have a greater impact on transactions for currency unit rates of low volatility.

At step S260, the controller 21 computes an source exchange rate that is the rate of the source exchange currency unit against the target exchange currency unit. The controller 21 also computes an input upper limit to the source exchange currency by multiplying an upper payout amount that is the upper limit of target exchange currency by the source exchange rate. The automated transaction apparatus 10 is set with an upper limit for the value of the target exchange currency it is possible to pay out for a single transaction. Such an approach is adopted since if there was no upper limit to the target exchange currency, the possibility increases of insufficient currency being stored in the automated transaction apparatus 10, and the possibility increases of dispensing amount exceeding the number of notes that the automated transaction apparatus 10 can dispense each time.

Figure 16:
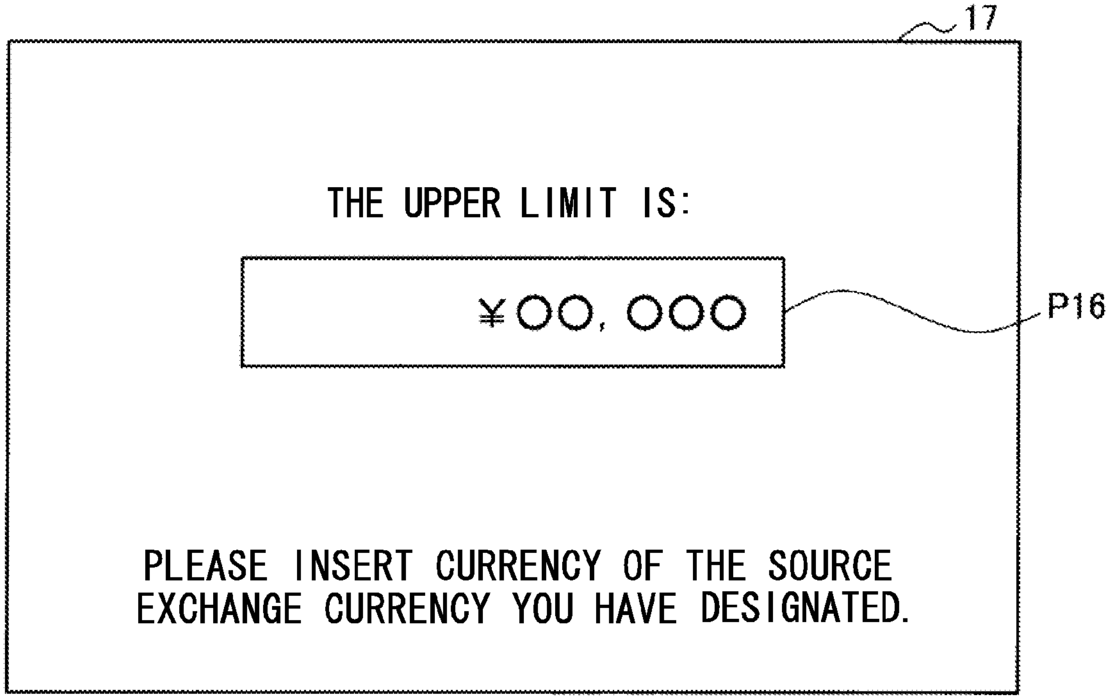
FIG. 16 is an example of a screen displayed by the automated transaction apparatus

At step S270, the controller 21 causes a source exchange upper limit amount display screen such as that illustrated in FIG. 16 to be displayed on the transaction information providing section 17. The source exchange upper limit amount display screen includes an upper limit amount display area P16 for displaying an upper limit amount for insertion. In the example illustrated in FIG. 16, the source exchange currency unit is Japanese yen.

At step S280, the banknote depositing and dispensing section 24 receives banknotes inserted by the user. Specifically, the banknote depositing and dispensing section 24 opens the banknote input-output port 15. The user inserts banknotes of the source exchange currency into the banknote input-output port 15. The banknote depositing and dispensing section 24 then conveys the inserted banknotes to the banknote identification section 25.

At step S290, the banknote identification section 25 identifies the currency unit and denomination of the inserted banknotes and outputs identification result data to the controller 21. Based on the identification result data, the controller 21 determines whether all of the inserted banknotes are of the source exchange currency. The controller 21 proceeds to step S300 when it has been determined that all of the inserted banknotes are of the source exchange currency. The controller 21 proceeds to step S370 when it is determined that some of the inserted banknotes are not banknotes of the source exchange currency.

At step S300, the controller 21 determines whether or not the total of the inserted banknotes exceeds the input upper limit. The controller 21 proceeds to step S310 when determined that the total of the inserted banknotes exceeds the input upper limit, and proceeds to step S320 when determined that the total of the inserted banknotes is the input upper limit or lower, while regarding all of the inserted banknotes as the source exchange currency.

Figure 17:
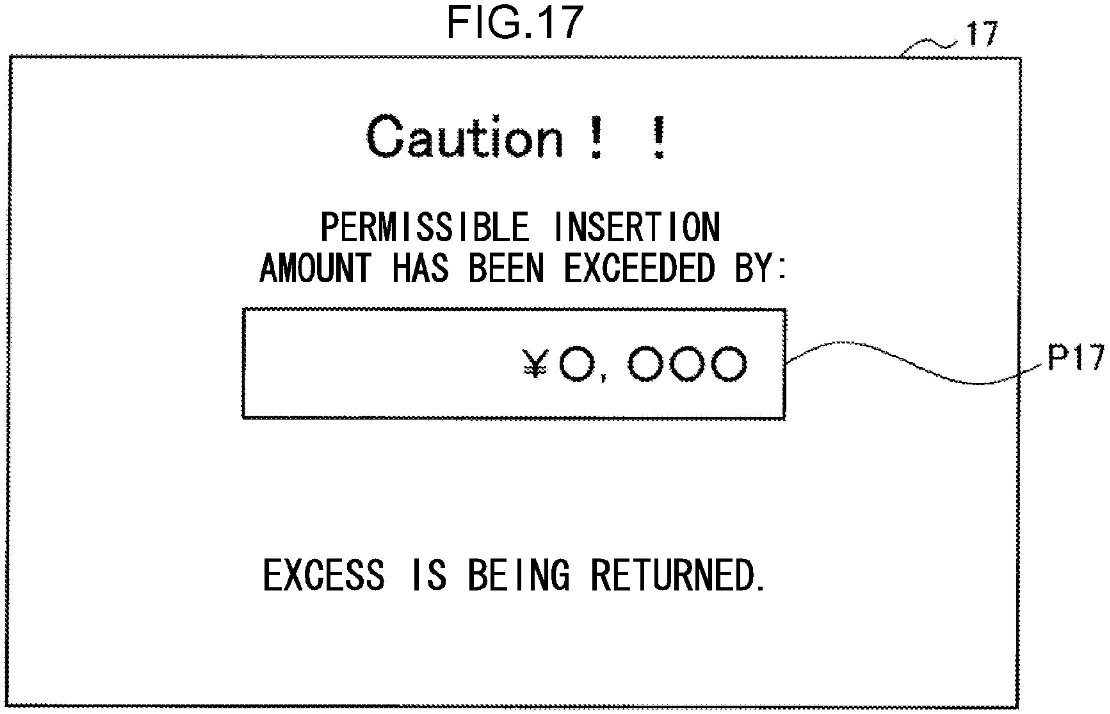
FIG. 17 is an example of a screen displayed by the automated transaction apparatus.

At step S310, the controller 21 performs excess processing. Specifically, the controller 21 computes the amount by which the total of the inserted banknotes exceeds the input upper limit, namely computes the excess amount. The controller 21 then causes an excess amount display screen such as that illustrated in FIG. 17 to be displayed on the transaction information providing section 17. The excess amount display screen includes an excess amount display area P17 displaying the excess amount. The controller 21 then computes the number of banknotes required to reduce the total of the inserted banknotes to the input upper limit amount or lower. The controller 21 then outputs return note number data that is the computed number of notes to the banknote depositing and dispensing section 24. Based on the return note number data, the banknote depositing and dispensing section 24 then returns the return note number of banknotes from the inserted banknotes to the user. The controller 21 then treats as the source exchange currency an amount that is the total inserted banknotes from which an amount of the value of the return note number of banknotes has been subtracted. Configuration may be made such that when there is an excess amount to the upper limit, the controller 21 immediately halts the transaction without performing the excess processing. In such cases, the processing proceeds directly to step S370.

Figure 18:
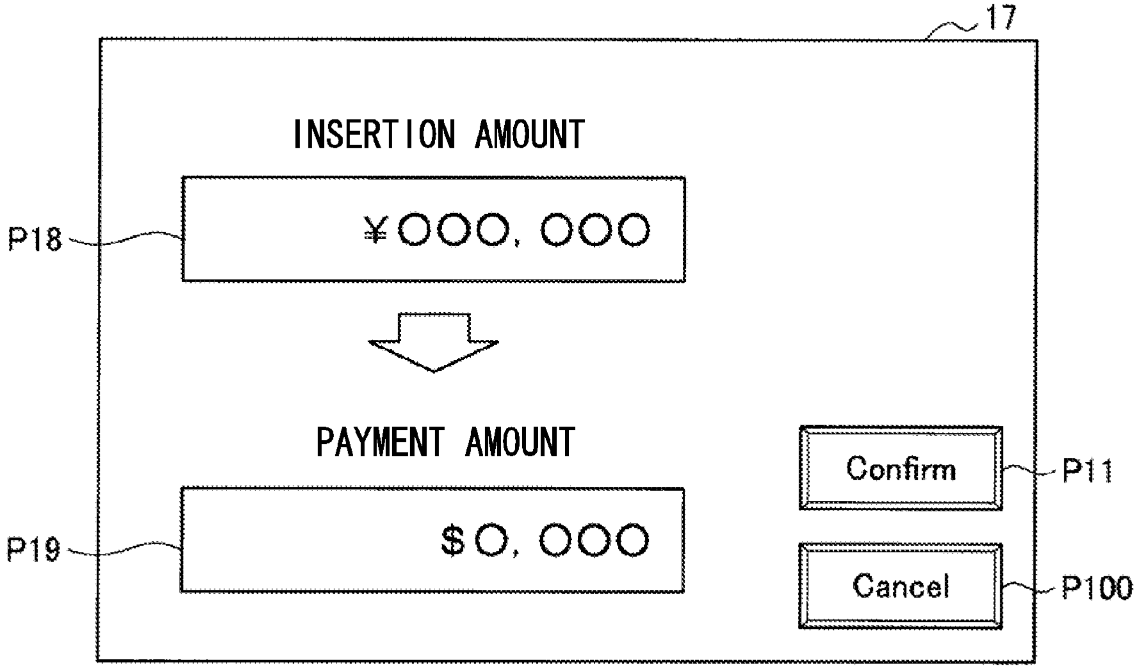
FIG. 18 is an example of a screen displayed by the automated transaction apparatus.

At step S320, the controller 21 computes the target exchange currency amount by multiplying the source exchange currency amount by the exchange target rate. The controller 21 then causes an insertion result display screen such as illustrated in FIG. 18 to be displayed on the transaction information providing section 17. The insertion result display screen includes a source exchange currency display area P18 displaying the source exchange currency amount, a target exchange currency display area P19, a confirmation button P11 and a cancel button P100.

The user may touch the confirmation button P11 to confirm the amounts displayed for the source exchange currency and the target exchange currency. The input section 18 outputs operation data corresponding to the user's input operation to the controller 21. However, the user may touch the cancel button P100 when the user wishes to cancel the exchange transaction. The input section 18 outputs operation data corresponding to the user's input operation to the controller 21.

Configuration may be made such that the controller 21 outputs to the banknote depositing and dispensing section 24 data expressing information indicating that additional source exchange currency may be inserted when the source exchange currency amount is lower than the input upper limit. In such a configuration, the banknote depositing and dispensing section 24 may then receive any additional source exchange currency inserted. Processing from step S290 onwards is then repeated when new source exchange currency has been inserted. Configuration may also be made such that the controller 21 includes data relating to the exchange target rate in the insertion result display screen when the automated transaction apparatus 10 accepts additional source exchange currency. The user is accordingly made aware of how much the target exchange currency will increase if a further amount of source exchange currency is inserted. The controller 21 may also include data relating to the difference between the source exchange currency amount and the input upper limit in the insertion result display screen. The user is accordingly able to determine how much more source exchange currency it is possible to insert.

At step S330, the controller 21 determines which button the user has touched based on operation data. The controller 21 outputs conveying instruction data to the banknote depositing and dispensing section 24 when it is determined that the user has touched the confirmation button P11. Based on the conveying instruction data, the banknote depositing and dispensing section 24 then conveys the inserted banknotes that are being temporarily held in the banknote identification section 25 to the storage processor 28. The storage processor 28 stores the inserted banknotes in the corresponding storage cassette. The controller 21 then proceeds to step S340. However, when it is determined that the user has touched the cancel button P100, the controller 21 proceeds to step S370.

At step S340, the controller 21 determines whether or not the need has arisen to pay out to the user at least a portion of the target exchange currency in coins. Examples of when such a need arises include, for example, when the target exchange currency is a monetary amount including small change, namely a monetary amount that can only be paid with coins, or when there is insufficient banknotes in the storage cassettes. An example of the former case is, for example, a target exchange currency monetary amount of JPY 20060. In this example, there is a small change amount of JPY 60.

The controller 21 proceeds to step S350 when the need arises to pay at least a portion of the target exchange currency to the user in coins; however, the controller 21 proceeds to step S360 when it is determined that the whole of the target exchange currency can be paid in notes.

At step S350, the controller 21 performs small change processing. Specifically, based on the target exchange currency amount and the state of the storage cassettes (data related to the state is provided from the storage processor 28), the controller 21 computes a coin payment amount that is need to be paid in coins. The controller 21 then outputs coin payment data related to the coin payment amount to the card processor 23. The card processor 23 takes a prepaid card out from a prepaid card storage section and stores the coin payment amount on the prepaid card. The card processor 23 then dispenses the prepaid card to the user. The controller 21 then treats as a new target exchange currency amount, an amount that is the previous target exchange currency amount from which the coin payment amount has been deducted.

Configuration may be made such that the card processor 23 stores the coin payment data on the cash card rather than storing the coin payment amount data on a prepaid card. Alternatively, the controller 21 may output the coin payment data to the document processor 22, and the document processor 22 store the coin payment data on a receipt, which is described later. Such a receipt has a similar function to that of a prepaid card. The controller 21 may also be configured to output the coin payment data to the storage processor 28. In such cases, the storage processor 28 takes coins of the coin payment amount from the coin storage section 30 based on the coin payment data, and places the coins on the coin conveying path. The coin deposit and dispensing section 26 conveys the coins to the coin input-output port 16 and pays the coins out to the user.

At step S360, the controller 21 performs exchange processing. Namely, the controller 21 outputs target exchange currency data related to the target exchange currency to the storage processor 28. Based on the target exchange currency data, the storage processor 28 then takes out banknotes corresponding to the target exchange currency from the storage cassette and places the banknotes on the banknote conveying path. The banknote depositing and dispensing section 24 conveys the banknotes on the banknote conveying path to the banknote input-output port 15 and pays the banknotes out to the user.

The controller 21 also outputs to the document processor 22 receipt issue instruction data including data related to the source exchange currency and the target exchange currency. The document processor 22 then issues a receipt on which such items as the source exchange currency and the target exchange currency are written, and dispenses the receipt to the user. Examples of the language of the receipt include the language of, for example, the country of the nationality of the user, a country in which the source exchange currency is in circulation, and a country that employs the target exchange currency. The controller 21 then outputs card return instruction data to the card processor 23, and the card processor 23 returns the cash card to the user based on the card return instruction data. The controller 21 then ends exchange processing.

At step S370, the controller 21 outputs card return instruction data to the card processor 23, and the card processor 23 returns the cash card to the user based on the card return instruction data. The controller 21 also outputs banknote return data to the banknote depositing and dispensing section 24. Based on the banknote return data, the banknote depositing and dispensing section 24 returns the inserted currency that is being temporarily held by the banknote identification section 25, that is the source exchange currency, to the user. The controller 21 then ends exchange processing.

Modified Example of Exchange Processing

Figure 7:
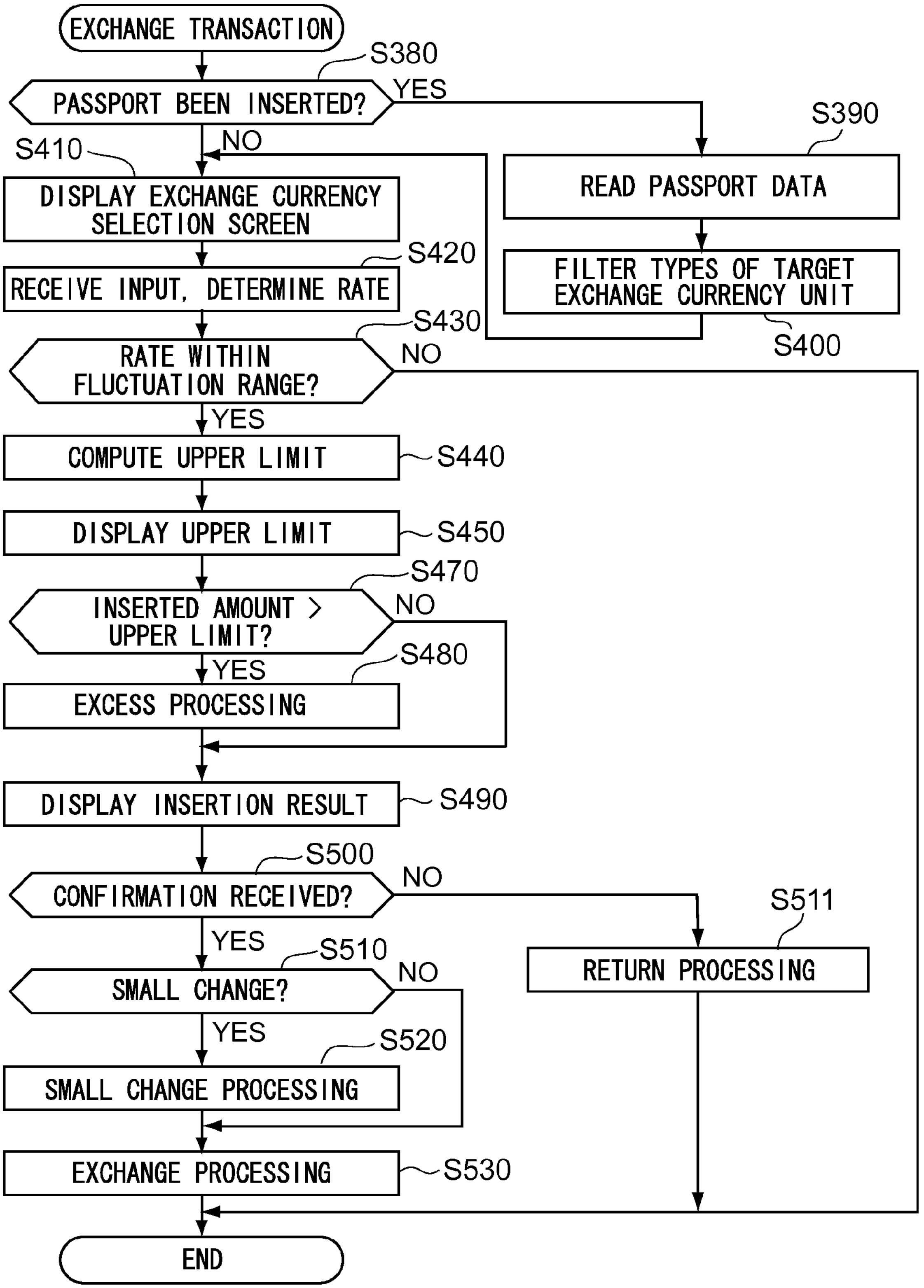
FIG. 7 is a flowchart illustrating a processing sequence according to the automated transaction apparatus.

Explanation follows regarding a modified example of exchange processing, with reference to FIG. 7. The automated transaction apparatus 10 performs at step S380 to step S400 similar processing to that of step S200 to step S220 illustrated in FIG. 6.

Figure 19:
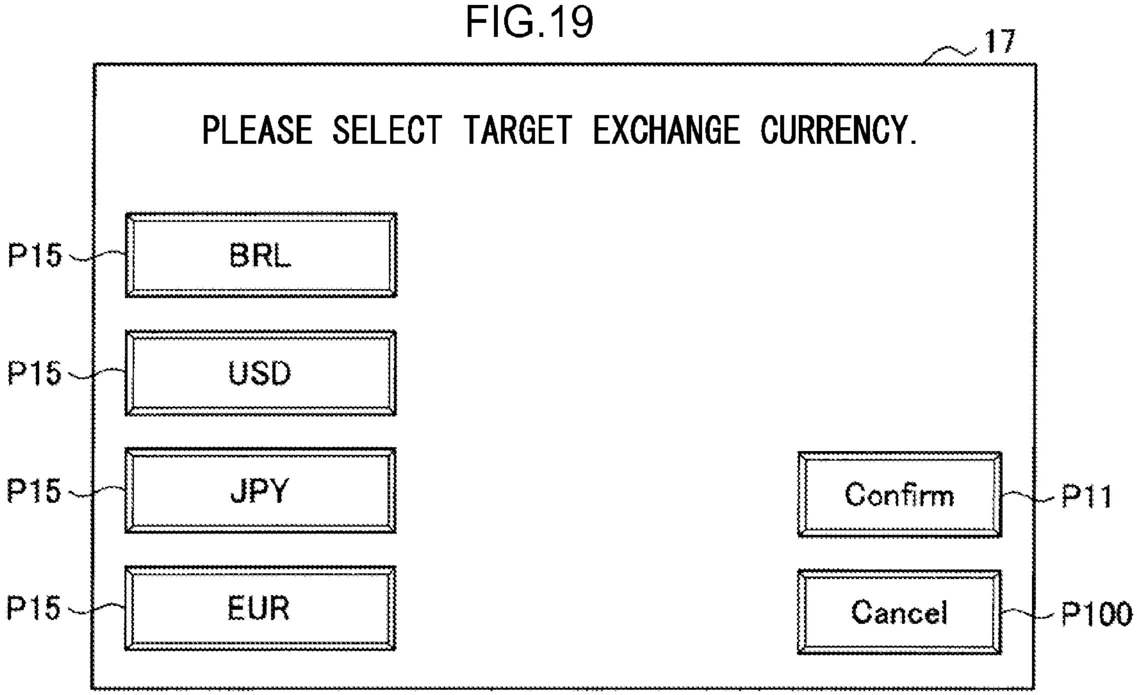
FIG. 19 is an example of a screen displayed by the automated transaction apparatus.

At step S410, the controller 21 causes an exchange currency selection screen such as that illustrated in FIG. 19 to be displayed on the transaction information providing section 17. The exchange currency selection screen includes a target exchange currency unit selection button P15, a confirmation button P11 and a cancel button P100. In this modified example, the user may select only the target exchange currency unit.

The user may select the desired target exchange currency unit from the target exchange currency unit candidates by touching the desired target exchange currency unit selection button P15. The input section 18 outputs operation data corresponding to the user's input operation to the controller 21. The controller 21 thereby ascertains the target exchange currency unit that has been selected by the user.

After selecting the target exchange currency unit, the user may then touch the confirmation button P11. The input section 18 outputs operation data corresponding to the user's input operation to the controller 21. The controller 21 thereby ascertains that the user has confirmed the target exchange currency unit. The controller 21 then proceeds to step S420.

At step S420, the banknote depositing and dispensing section 24 receives banknotes inserted by the user. Specifically, the banknote depositing and dispensing section 24 opens the banknote input-output port 15. The user may insert banknotes of the source exchange currency into the banknote input-output port 15. When this is performed, the user may insert plural types of banknotes of mutually different currency units all at once. The banknote depositing and dispensing section 24 conveys the inserted banknotes to the banknote identification section 25.

The banknote identification section 25 identifies the currency unit and denomination of the inserted banknotes, and outputs identification result data to the controller 21. The controller 21 thereby ascertains the source exchange currency unit and source exchange currency amount based on the identification result data. The controller 21 then acquires rate data from the storage unit 20, and computes an exchange target rate that is a rate of the target exchange currency unit against the source exchange currency unit.

The automated transaction apparatus 10 performs similar processing at step S430 to step S530 to that of the processing of step S250 to step S270 and step S300 to step S370 illustrated in FIG. 6. Configuration may be made such that the controller 21 can receive cancellation from the user separately for each of the source exchange currency units during processing of step S500.

Transfer Processing

Figure 8:
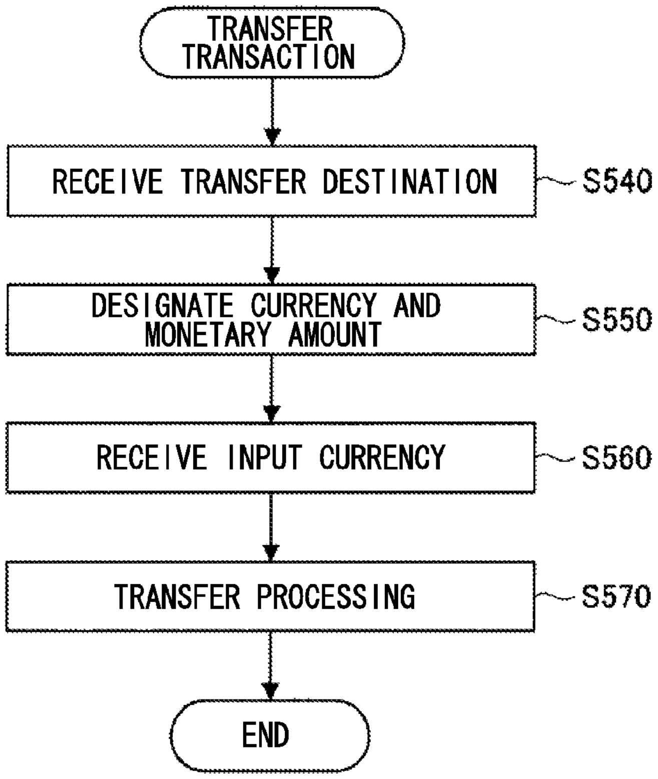
FIG. 8 is a flowchart illustrating a processing sequence according to the automated transaction apparatus.

Explanation follows regarding wire transfer, with reference to FIG. 8. At step S540, the controller 21 prompts a user to input an account, which is a wire transfer destination. For example, the automated transaction apparatus 10 may display a list of transaction enabled financial institutions, together with a ten-key, on the transaction information providing section 17.

Figure 20:
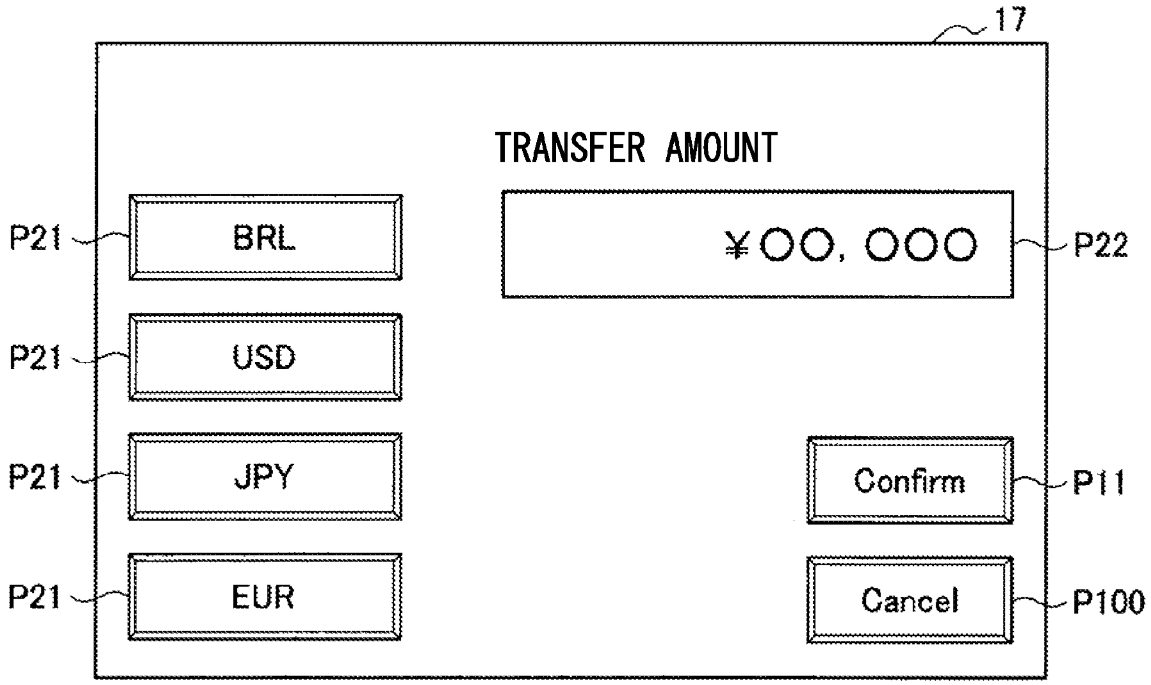
FIG. 20 is an example of a screen displayed by the automated transaction apparatus.

At step S550, the controller 21 then causes a transfer currency designation screen such as that illustrated in FIG. 20 to be displayed on the transaction information providing section 17. The transfer currency designation screen includes transfer currency unit selection buttons P21, a transfer amount display area P22, a confirmation button P11 and a cancel button P100, and the ten-key, which is not shown in the drawings. Characters indicating types of transfer currency unit are depicted on the transfer currency unit selection buttons P21. The transfer currency designation screen illustrated in FIG. 20 includes transfer currency unit selection buttons P21 corresponding to "Brazilian real", "US dollar", "Japanese yen" and "Euro" as the transfer currency unit selection buttons P21; however, obviously the transfer currency unit selection buttons P21 may include buttons corresponding to other currency units than these. The monetary amount to be transferred to the user designated account, namely the transfer amount is displayed in the transfer amount display area P22.

The user may touch the desired transfer currency unit selection button P21. The input section 18 outputs operation data corresponding to the user's input operation to the controller 21. The controller 21 thereby ascertains the selected transfer currency unit that is selected by the user. The user may also input a desired value by touching the ten-key. The input section 18 outputs operation data corresponding to the user's input operation to the controller 21. The controller 21 thereby ascertains a transfer reference value that is the value input by the user. The controller 21 determines the wire transfer reference value expressed in the selected transfer currency unit as a transfer amount. The controller 21 stores the transfer amount in the storage unit 20. The controller 21 displays the transfer amount in the transfer amount display area P22.

At step S560, the depositing and dispensing section 24 and/or the coin deposit and dispensing section 26 receive currency inserted by the user. Specifically, the banknote input-output port 15 and the coin input-output port 16 are opened. The user may insert banknotes as desired into the banknote input-output port 15. When doing so the user may insert plural types of banknote of mutually different currency unit all at once. When the user wishes to deposit coins, the user may also insert coins into the coin input-output port 16. The user may also insert plural types of coin of mutually different currency unit all at once. The depositing and dispensing section 24 and/or the coin deposit and dispensing section 26 convey the inserted banknotes and/or the inserted coins to the banknote identification section 25 and/or the coin identification section 27. The banknote identification section 25 and/or the coin identification section 27 verify the currency unit and denomination for each of the inserted banknotes and each of the inserted coins, and output identification result data to the controller 21.

At step S570, the controller 21 performs transfer processing. Specifically, based on the identification result data and rate data stored in the storage unit 20, the controller 21 determines whether or not the total of the inserted banknotes and the inserted coins (as converted into the transfer currency unit) matches the transfer amount. When the total of the inserted banknotes and the inserted coins matches the transfer amount, the controller 21 transfers the transfer amount to the account designated by the user. The depositing and dispensing section 24 and/or the coin deposit and dispensing section 26 also convey the inserted banknotes and inserted coins to the storage processor 28. The storage processor 28 stores the inserted banknotes and inserted coins in the banknote storage section 29 and/or the coin storage section 30. The controller 21 returns the cash card and issues a receipt, before ending the transfer processing. However, when the total of the inserted banknotes and the inserted coins does not match the transfer amount, the controller 21 returns the cash card, returns the inserted banknotes and inserted coins, and ends the transfer processing.

As described above, the automated transaction apparatus 10 identifies the inserted currency that has been inserted by a user when plural types of currency of mutually different currency unit have been inserted, and performs transactions with the user based on the identification result. The automated transaction apparatus 10 can accordingly perform transactions using more varieties of currencies than previously.

When counterfeit currency is included in the inserted currency, the automated transaction apparatus 10 determines a type of processing for the counterfeit currency based on the currency unit of the counterfeit currency, and the processing can be performed according to the legal framework of the country in which the currency unit of the counterfeit currency is in circulation.

Specifically, when the currency unit of the counterfeit currency is euro, the automated transaction apparatus 10 determines the type of processing for the counterfeit currency as "retain", and when the currency unit of the counterfeit currency is other currency unit than euro, the automated transaction apparatus 10 determines the type of processing for the counterfeit currency as "return". The automated transaction apparatus 10 can thereby perform processing according to the legal framework of the euro region (for example "EC Council Regulation 1338, Article-6"). Further, since the automated transaction apparatus 10 determines a type of processing for counterfeit currency based on the counterfeit currency processing table, and it can rapidly and accurately determine the processing to be employed for the counterfeit currency. The counterfeit currency processing table may be alternatively stored on the server 50.

The automated transaction apparatus 10 can be further configured such that when there is counterfeit currency in the inserted currency, a user can select the processing for the counterfeit currency from among returning the counterfeit currency or retaining the counterfeit currency. For example, the user can select processing conforming to the legal framework of the region where the automated transaction apparatus 10 is installed.

Furthermore, when a need arises to pay at least a portion of the target exchange currency in coins, the automated transaction apparatus 10 issues a user with a prepaid card or cash card stored with data relating to the coin payment amount. The user can accordingly receive payment of the coins by taking the prepaid card or the cash card to a financial institution.

When the monetary amount of the inserted currency has exceeded the input upper limit, the automated transaction apparatus 10 cancels exchange transactions for at least the portion of the inserted currency exceeding the input upper limit. Consequently, the automated transaction apparatus 10 can terminate a transaction if a user inserts currency of an amount exceeding the input upper limit.

Further, since the automated transaction apparatus 10 can display the input upper limit, the user can easily ascertain the input upper limit.

Note that while detailed explanation has been given above exemplary embodiments with reference to the attached drawings, embodiments of the present invention is not limited thereby. It would be clear to a person of normal skill in the art that there are various examples of modifications and improvements falling within the conceivable technical scope as defined by the claims. Obviously, these modifications and improvements are within to the technical scope of the present invention. For example, the counterfeit currency processing performed in the deposit transaction (the processing of step S130 to step S160) may also be performed in other transactions. The automated transaction apparatus 10 may also be employed for various transactions other than relating to cash such as, for example, for buying and selling tickets for travel on a public transport system.

What is claimed is:

1. An automated transaction apparatus comprising:

a currency depositing and dispensing section that deposits and dispenses a coin and/or a banknote, and that controls a currency input-output port;

an identification section that, after a plurality of types of currency having mutually different currency units have been inserted, identifies the inserted currency, and that ascertains whether or not the inserted currency is counterfeit currency; and a controller that effects control of a transaction with a user based on identification results determined by the identification section, and that selects a different type of processing for each currency unit of the counterfeit currency if the inserted currency has been ascertained to be counterfeit currency;

wherein the identification section outputs the identification results to the controller;

wherein, based on the currency unit of the counterfeit currency, the controller effects control to determine the type of processing for each currency unit of the counterfeit currency as either:

returning the counterfeit currency to the user; or retaining the counterfeit currency in a counterfeit currency storage section for storing counterfeit currency;

wherein the controller outputs retain instruction data to the currency depositing and dispensing section when the controller determines the type of processing for the counterfeit currency as retaining the counterfeit currency in the counterfeit currency storage section based on the identification results, and the controller outputs return instruction data to the currency depositing and dispensing section when the controller determines the type of processing for the counterfeit currency as returning the counterfeit currency to the user based on the identification results; and wherein the currency depositing and dispensing section conveys the counterfeit currency to the counterfeit currency storage section according to the retain instruction data, and the currency depositing and dispensing section returns the counterfeit currency from the currency input-output port to the user according to the return instruction data.

2. The automated transaction apparatus of claim 1, further comprising a storage unit that stores a counterfeit currency processing table in which currency units of counterfeit currencies are stored in association with types of processing for each of the currency units of counterfeit currencies.

3. The automated transaction apparatus of claim 2, wherein the controller determines the type of processing for the counterfeit currency based on the counterfeit currency processing table stored by the storage unit.

4. The automated transaction apparatus of claim 1, further comprising:

a medium processing section, wherein the controller effects control to exchange the inserted currency for a target exchange currency that is currency of a different currency unit to the currency unit of the inserted currency; and wherein the medium processing section, if the user is to be paid coins for at least a portion of the target exchange currency, receives data relating to the monetary amount to be paid in coins from the controller, records the data on a recording medium, and provides the user with the recording medium.

5. The automated transaction apparatus of claim 4, wherein the controller computes an input upper limit of the inserted currency based on a payout upper limit that is an upper limit for possible payouts of the target exchange currency and is based on a rate of the target exchange currency against the inserted currency; and, if a monetary amount of the inserted currency exceeds the input upper limit, effects control to cancel exchange of at least a portion of the inserted currency that exceeds the input upper limit.

6. The automated transaction apparatus of claim 5, wherein the controller effects control to present the input upper limit to the user.

7. The automated transaction apparatus to claim 1, wherein the controller causes the counterfeit currency to be conveyed to different locations according to the currency unit of the counterfeit currency.

8. The automated transaction apparatus to claim 1, wherein the identification section ascertains that the inserted currency is a counterfeit currency if at least one of its currency unit or denomination cannot be identified.

9. The automated transaction apparatus to claim 1, wherein the controller effects control so as to exchange the inserted currency for a target exchange currency that is a currency of a different currency unit to the currency unit of the inserted currency, and so as to display candidates for the target exchange currency based on read information of a passport.

10. An automated transaction method comprising:

after a plurality of types of currency with mutually different currency units for different usable regions have been inserted in a currency input-output port controlled by a currency depositing and dispensing section that deposits and dispenses a coin and/or a banknote, identifying the inserted currency and ascertaining whether or not the inserted currency is counterfeit currency;

outputting a result of the identification to a controller;

controlling by the controller a transaction with a user based on the identification results, and selecting a different type of processing for each currency unit of the counterfeit currency if the inserted currency has been ascertained to be counterfeit currency;

wherein the controlling comprises determining, based on the currency unit of the counterfeit currency, the type of processing for each currency unit of the counterfeit currency as either:

returning the counterfeit currency to the user; or retaining the counterfeit currency in a counterfeit currency storage section for storing counterfeit currency;

wherein the controlling comprises outputting retain instruction data to the currency depositing and dispensing section when the controller determines the type of processing for the counterfeit currency as retaining the counterfeit currency in the counterfeit currency storage section based on the identification results, and the controlling comprises outputting return instruction data to the currency depositing and dispensing section when the controller determines the type of processing for the counterfeit currency as returning the counterfeit currency to the user based on the identification results; and wherein the automated transaction method further comprising:

conveying, by currency depositing and dispensing section, the counterfeit currency to the counterfeit currency storage section according to the retain instruction data, and returning, by the currency depositing and dispensing section, the counterfeit currency from the currency input-output port to the user according to the return instruction data.

11. The automated transaction method of claim 10, further comprising storing a counterfeit currency processing table in which currency units of counterfeit currencies are stored in association with types of processing for each of the currency units of counterfeit currencies.

12. The automated transaction method of claim 11, wherein the controlling comprises determining the type of processing for the counterfeit currency based on the stored counterfeit currency processing table.

13. The automated transaction method of claim 10 wherein the controlling comprises exchanging by a medium processing section the inserted currency for a target exchange currency that is currency of a different currency unit to the currency unit of the inserted currency; and, wherein the exchanging comprises:

if the user is to be paid coins for at least a portion of the target exchange currency, receiving data relating to the monetary amount to be paid in coins from the controller, recording the data on a recording medium, and providing the user with the recording medium.

14. The automated transaction method of claim 13 wherein the controlling comprises computing an input upper limit of the inserted currency based on a payout upper limit that is an upper limit for possible payouts of the target exchange currency and is based on a rate of the target exchange currency against the inserted currency; and, if a monetary amount of the inserted currency exceeds the input upper limit, performing control to cancel exchange of at least a portion of the inserted currency that exceeds the input upper limit.

15. The automated transaction method of claim 14 wherein the controlling comprises presenting the input upper limit to the user.

16. A non-transitory storage medium that stores a program causing a computer to execute automated transaction processing, the automated transaction processing comprising:

after a plurality of types of currency with mutually different currency units for different usable regions have been inserted in a currency input-output port controlled by a currency depositing and dispensing section that deposits and dispenses a coin and/or a banknote, identifying the inserted currency and ascertaining whether or not the inserted currency is counterfeit currency;

outputting a result of the identification to a controller;

controlling by the controller a transaction with a user based on the identification results, and selecting a different type of processing for each currency unit of the counterfeit currency if the inserted currency has been ascertained to be counterfeit currency;

wherein, based on the currency unit of the counterfeit currency, the controlling includes determining the type of processing for each currency unit of the counterfeit currency as either:

returning the counterfeit currency to the user; or retaining the counterfeit currency in a counterfeit currency storage section for storing counterfeit currency;

wherein the controlling comprises outputting retain instruction data to the currency depositing and dispensing section when the controller determines the type of processing for the counterfeit currency as retaining the counterfeit currency in the counterfeit currency storage section based on the identification results, and the controlling comprises outputting return instruction data to the currency depositing and dispensing section when the controller determines the type of processing for the counterfeit currency as returning the counterfeit currency to the user based on the identification results; and wherein the automated transaction method further comprises:

conveying, by currency depositing and dispensing section, the counterfeit currency to the counterfeit currency storage section according to the retain instruction data, and returning, by the currency depositing and dispensing section, the counterfeit currency from the currency input-output port to the user according to the return instruction data.

* * * * *